US012572835B2

(12) United States Patent
Kikuchi et al.

(10) Patent No.: US 12,572,835 B2
(45) Date of Patent: Mar. 10, 2026

(54) QUANTUM DEVICE

(71) Applicant: NEC Corporation, Tokyo (JP)

(72) Inventors: Katsumi Kikuchi, Tokyo (JP); Akira Miyata, Tokyo (JP); Kunihiko Ishihara, Tokyo (JP); Yoshihito Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 703 days.

(21) Appl. No.: 17/974,744

(22) Filed: Oct. 27, 2022

(65) Prior Publication Data

US 2023/0162080 A1 May 25, 2023

(30) Foreign Application Priority Data

Nov. 8, 2021 (JP) .................................. 2021-181918

(51) Int. Cl.
*G06N 10/40* (2022.01)

(52) U.S. Cl.
CPC .................................... *G06N 10/40* (2022.01)

(58) Field of Classification Search
CPC ......... G06N 10/40; G06F 30/30; G06F 30/39; G06F 30/392; G06F 30/394; H10D 89/10
USPC .......................................................... 716/100
See application file for complete search history.

(56) References Cited

U.S. PATENT DOCUMENTS

| | | | |
|---|---|---|---|
| 10,380,496 B2 | 8/2019 | Elsherbini et al. | |
| 2004/0094770 A1* | 5/2004 | Ogihara ................... B41J 2/451 |
| | | | 257/79 |

2005/0017162 A1* 1/2005 Nagakubo ............... H01J 37/28
                                                  250/281

| | | | |
|---|---|---|---|
| 2015/0323738 A1 | 11/2015 | Sekiguchi et al. | |
| 2016/0314407 A1 | 10/2016 | Bunyk et al. | |
| 2017/0373044 A1* | 12/2017 | Das ................. H01L 23/53285 |
| 2019/0088612 A1 | 3/2019 | Inoto et al. | |
| 2020/0006620 A1 | 1/2020 | Mutus et al. | |
| 2020/0058702 A1 | 2/2020 | Kelly et al. | |
| 2021/0167271 A1 | 6/2021 | Hidaka et al. | |

FOREIGN PATENT DOCUMENTS

| | | |
|---|---|---|
| JP | 2011-524026 A | 8/2011 |
| JP | 2015-216169 A | 12/2015 |
| JP | 2019-504511 A | 2/2019 |
| JP | 2019-054155 A | 4/2019 |

(Continued)

OTHER PUBLICATIONS

Alysson Gold et al., "Entanglement Across Separate Silicon Dies in a Modular Superconducting Qubit Device", Quantum Physics, Sep. 28, 2021.

(Continued)

*Primary Examiner* — Paul Dinh
(74) *Attorney, Agent, or Firm* — Sughrue Mion, PLLC

(57) ABSTRACT

A quantum device includes a first quantum chip, a second quantum chip, and one or more interposer substrates mounting the first quantum chip and the second quantum chip. The first quantum chip and the second quantum chip mounted on a same or different interposer substrates, have surfaces with at least partial regions thereof opposing each other, and electrical connection is made between opposing connection terminals arranged in at least partial regions of the surfaces, opposed to each other, of the first quantum chip and the second quantum chip.

13 Claims, 34 Drawing Sheets

1

(56)                         References Cited

FOREIGN PATENT DOCUMENTS

| JP | 2020-038976 A | 3/2020 |
| JP | 2020-511794 A | 4/2020 |
| JP | 6757948 B2 | 9/2022 |
| WO | 2018/169585 A1 | 9/2018 |

OTHER PUBLICATIONS

M. Veldhorst et al., "An addressable quantum dot qubit with fault-tolerant control fidelity", nature nanotechnology Oct. 12, 2014.

JP Office Action for JP Application No. 2021-181918, mailed on Jul. 15, 2025 with English Translation.

JP Official Communication for JP Application No. 2021-181918, mailed on Oct. 28, 2025 with English Translation.

* cited by examiner

101

101 : Si SUBSTRATE

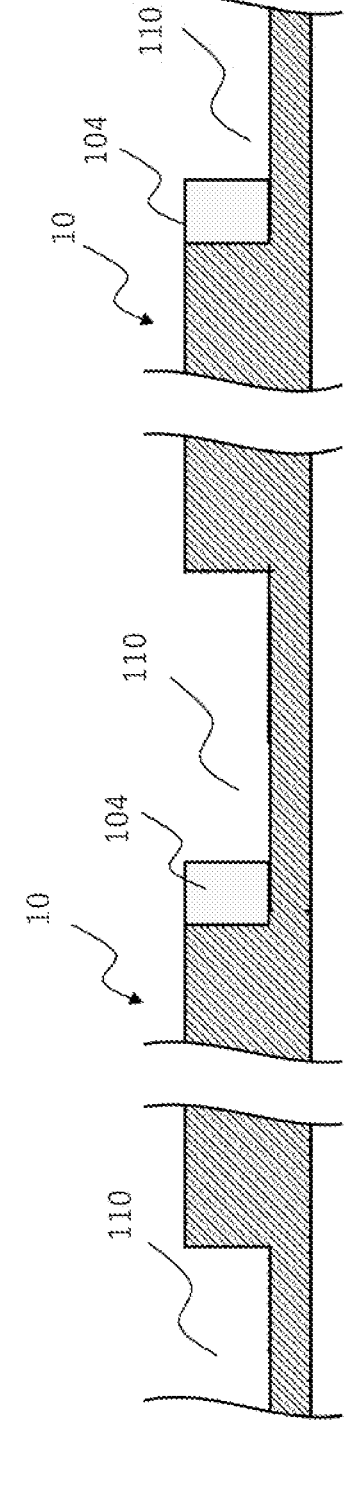
FIG. 7D
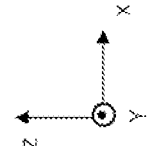

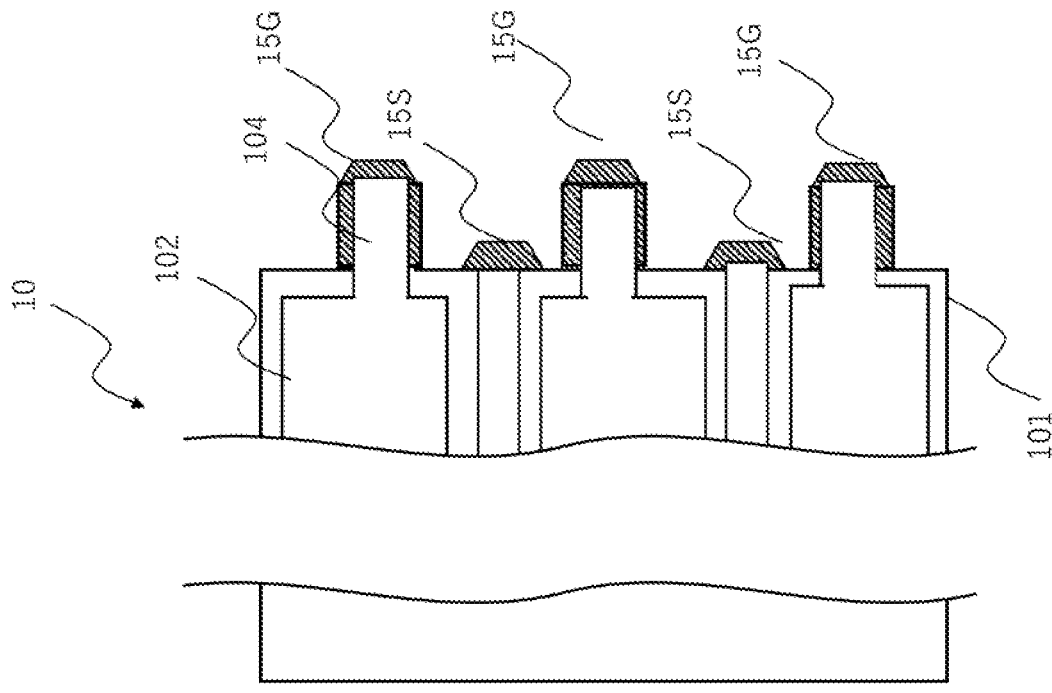
FIG. 7E
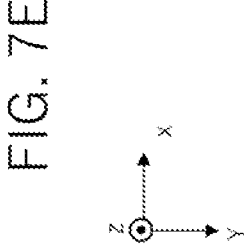

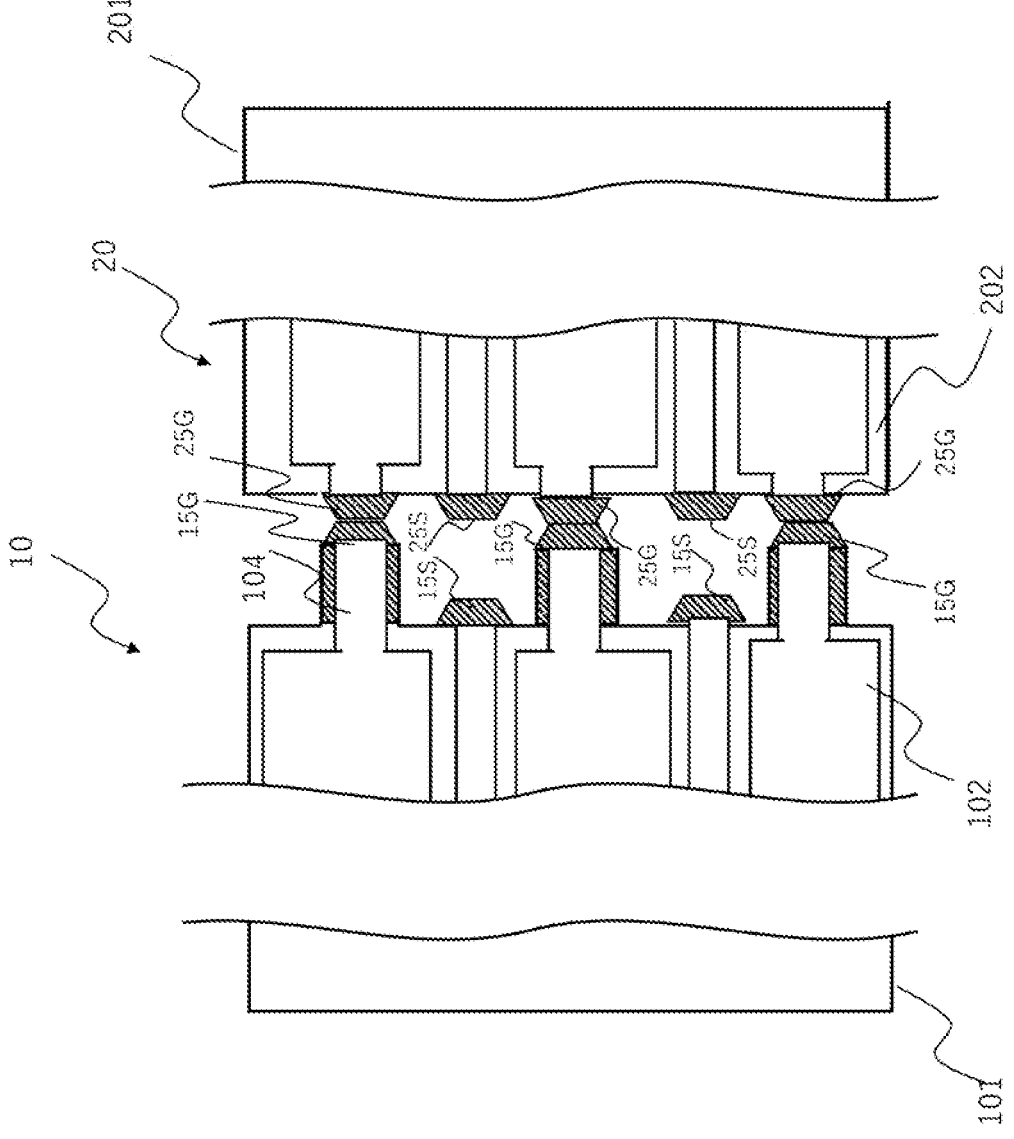
FIG. 7G
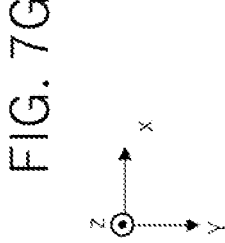

QUANTUM DEVICE

CROSS REFERENCE TO RELATED APPLICATIONS

This application is based upon and claims the benefit of the priority of Japanese patent application No. 2021-181918, filed on Nov. 8, 2021, the disclosure of which is incorporated herein in its entirety by reference thereto.

FIELD

This invention relates to a quantum device.

BACKGROUND

In a quantum computer apparatus, data is manipulated using a qubit(s) (or quantum bit(s)) which are quantum mechanical phenomena. Here, quantum mechanical phenomena include superposition of a plurality of states (a quantum variable can take on a plurality of different states simultaneously) and entanglement (a state in which a plurality of quantum variables are related regardless of space or time). A quantum chip includes a qubit circuit that writes and read data to and from a qubit and operates on the data.

As the number of qubits in a quantum computer apparatus increases, investigation is underway to adopt a three-dimensional arrangement in place of a planar one. For example, PTL (patent literature) 1 discloses a configuration including a quantum chip with a qubit circuit and an interposer substrate on which the quantum chip is mounted. An interposer substrate (also termed as an interposer) includes a substrate with through vias that connect wirings (circuits and electrodes) on a front surface and a back surface of the substrate.

In order to deal with more complex problems in a quantum chip and an interposer substrate, an increase in the number of qubits is inevitably required. Generally, an increase in the number of qubits requires an increase in a size (area) of the quantum chip and interposer substrate. On the other hand, when the area of a quantum chip and an interposer substrate is increased, missing of a wiring pattern or an insulation layer (mainly open circuit defect) occurs or a pattern residue(s) due to particles or a resist residue(s) (mainly short circuit-defect) occurs during a manufacturing process. As a result, it is difficult to secure good products.

Furthermore, with increase in a size of a quantum chip and an interpose, a decline in an alignment accuracy of a chip periphery occurs in device manufacturing. The decline in the alignment accuracy of the chip periphery includes misalignment in X and Y directions as well as misalignment in a θ direction (θ misalignment). In addition, when the number of connection terminals (connection area) increases with increase in a size of a quantum chip and an interposer substrate, a higher mount load (contact load) is required, resulting in an increase of height accuracy and positional variation. This results in lower manufacturing yields.

To address the issue of yield reduction due to an increase in a size of a single quantum chip or interposer substrate, it is known that an appropriate size of a quantum chip or interposer substrate (e.g., a size that can be configured as a function and has less performance variation) is selected, and a plurality of quantum chips and interposer substrates of that size are connected.

As a superconducting qubit device with a plurality of qubit chips and an interposer substrate, NPL (Non-Patent Literature) 1, for example, discloses a configuration in which a plurality of qubit chips are mounted on a carrier chip (interposer substrate) and the qubit chips are connected to the carrier chip by capacitive coupling. NPL 1 disclose a configuration as schematically illustrated in FIG. 9A, in which a single carrier chip (interposer substrate) 503 on which a plurality of qubit 501 and 502 chips are mounted, connects the qubit chips 501 and 502 by capacitive coupling. The qubit chips 501 and 502 are flip-chip mounted with indium (In) bumps 507 and 508 on the carrier chip (interposer substrate) 503 with each circuit plane down. A terminal (electrodes) 504 of a qubit of the qubit chip 501 is capacitively coupled to a terminal (electrode) 506 which is arranged on a facing surface of the carrier chip (interposer substrate) 503. A terminal (electrode) 505 of a qubit of the qubit chip 502 is capacitively coupled to a terminal (electrode) 506 arranged on the facing surface of the carrier chip (interposer substrate) 503. A plurality of capacitively coupled terminals 504(505) of the qubit chip 501 (502) are arranged in a row along an end edge of the chip. FIG. 9A is based on FIG. 1(a) of NPL 1, and reference numerals are newly assigned herein.

In addition, PTL 2 discloses a configuration in which a plurality of quantum chips are arranged side-by-side on an interposer substrate and a plurality of quantum chips are connected to the interposer substrate using metal bumps, as schematically illustrated in FIG. 9B. In FIG. 9B, reference numerals 601 and 602 are first and second qubit substrate, 603 is a base substrate (interposer substrate), 604 and 609 are superconducting wirings, 605 and 610 are superconducting qubits, and 606 and 611 are superconducting solder bumps. FIG. 9B is based on FIG. 2 of PTL2 and the reference numerals are changed.

Furthermore, as schematically illustrated in FIG. 9C, in PTL 3, first and second chips 701 and 702 are mounted with a first face (circuit plane) down on the interposer substrate 703. An electrode 704 on the first face of the first chip 701 and an electrode 705 on the first surface of the second chip 702 are connected by a wiring 706 (lateral wiring: Air-Bridge). FIG. 9C is based on FIG. 2 of PTL 3, and the reference numerals are changed.

PTL 1: U.S. Unexamined Patent Application Publication No. 2020/0058702 A1

PTL 2: Japanese Patent No. 6757948

PTL 3: U.S. Pat. No. 10,380,496 B2

NPL 1: Alysson Gold et al., "Entanglement Across Separate Silicon Dies in a Modular Superconducting Qubit Device", Quantum Physics, Sep. 28, 2021

NPL 2: M. Veldhorst et al., "An addressable quantum dot qubit with fault-tolerant control fidelity", nature nanotechnology 12, Oct., 2014

SUMMARY

In any kind of connection such as wireless connection (capacitive coupling, or inductive coupling), bump connection, or lateral wiring used for connection of terminals between chips, energy loss due to an impedance mismatch with respect to a connection portion and superimposition of an unnecessary frequency component(s) (noise) on a signal easily occur. Thus, it is required to keep a distance between terminals to the minimum necessary.

In NPL 1, there are two wireless connection points in a single connection path between the two qubit chips. That is, referring to FIG. 9A, in a connection path between the first and second qubit chips 501 and 502, there is a capacitive coupling between the terminal (electrode) 504 of the first qubit chip 501 and the terminal (electrode) 506 of the interposer substrate 503 and a capacitive coupling between the terminal (electrode) 506 of the interposer substrate 503 and the terminal (electrode) 505 of the second qubit chip 502. Each wireless connection (capacitive coupling) has a power loss effect. In addition, the wireless connection also has a problem that a less accurate alignment of the opposing terminals (electrodes) will result in worsening of the power loss.

In PTL 2, for example, as illustrated in FIG. 9B, a direction of a current changes significantly at each connection point of the superconducting solder bumps 606 and 611. This generates a problem that signal characteristics are deteriorated due to an effect of reflection and the like.

In PTL 3, as illustrated in FIG. 9C, the lateral wiring (airbridge) 706 has a large change in a direction of a current at a connection point of the lateral wiring 706 and each of the electrodes 704 and 705. In addition to signal reflections occurring at each connection point, a signal line cannot be properly protected by ground. This causes signal characteristics to deteriorate.

As described above, a further increase in the number of qubits in a quantum computer apparatus results in an increase in an area of the quantum chip and interposer substrate, which in turn results in a decrease in a yield, connection accuracy, etc. of the quantum device product. On the other hand, if a plurality of quantum chips and interposer substrates with a size suitable for a yield, connection accuracy, etc., a problem of deterioration of signal characteristics in connection between quantum chips occurs.

Therefore, an object of the present disclosure is to provide a quantum device that solves the above problem.

According to one aspect of the present disclosure, there is provided a quantum device including a first quantum chip, a second quantum chip, and one or more interposer substrates mounting the first quantum chip and the second quantum chip, wherein the first quantum chip and the second quantum chip mounted on a same interposer substrate or different interposer substrates, have surfaces with at least partial regions thereof opposed to each other, the first quantum chip and the second quantum chip including mutually opposing connection terminals arranged respectively in the at least partial regions of the surfaces, opposed to each other, of the first quantum chip and the second quantum chip, the mutually opposing connection terminals of the first quantum chip and the second quantum chip electrically connected.

According to the disclosure, it is possible to avoid yield and connection accuracy degradation, and thus avoid degradation of signal characteristics, for an increase in the number of qubits in a quantum computer apparatus.

BRIEF DESCRIPTION OF THE DRAWINGS

FIG. 7D is a diagram schematically illustrating a side section of another example of a quantum chip of another embodiment.

FIG. 7E is a plan view schematically illustrating another example of a quantum chip of another embodiment.

FIG. 7G is a plan view schematically illustrating another example of a quantum chip of another embodiment.

EXAMPLE EMBODIMENTS

Figure 1A:
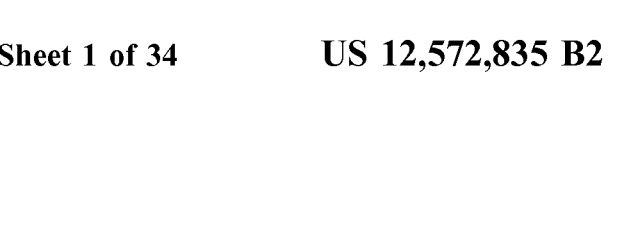
FIG. 1A is a schematic diagram of a quantum device of one embodiment.

According to one of aspects of the present disclosure, a quantum device (1) constituting a quantum computing apparatus includes, as a plurality of quantum chips, at least a first quantum chip (10) and a second quantum chip (20), and at least one interposer substrate (30) with the first quantum chip (10) and the second quantum chip (20) mounted thereon. Alternatively, the first quantum chip (10) and the second quantum chip (20) may be mounted on interposer substrates (30, 40). Alternatively, a single interposer substrate (40) may be configured to mount one or more other interposer substrates (30).

The first quantum chip (10) and the second quantum chip (20) mounted on a same interposer substrate or different interposer substrates, have respectively surfaces with at least partial regions thereof opposed to each other, and an electrical connection is made between mutually opposing connection terminals (11, 21, or 15, 25) arranged respectively in the at least partial regions of the mutually opposing surfaces of the first quantum chip and the second quantum chip.

The first quantum chip (10) has one or more connection terminals (11) in the partial region of the same surface as a first surface (circuit plane) in which at least one qubit circuit (12) is arranged. The second quantum chip (20) has one or more connection terminals (21) in the partial region of the same surface as a first surface (circuit plane) on which the at least one qubit circuit (22) is arranged.

The first quantum chip (10) is mounted on the first interposer substrate (30) with at least one side edge of the first quantum chip (10) protruded more than a corresponding side edge of the interposer substrate (30). A region (103) of the first face (circuit plane) of the first quantum chip (10) protruded more than the side edge of the first interposer substrate (30) is opposed to the first face (circuit plane) of the second quantum chip (20). One or more connection terminals (11) provided in the region (103) protruded more than the side edge of the first interposer substrate (30) on the first surface of the first quantum chip (10), are electrically connected to one or more connection terminals (21) at a location on the first surface of the second quantum chip (20).

The first quantum chip (10) is mounted on the first interposer substrate (30) with the first surface (circuit plane) of the first quantum chip (10) flip-chipped (face-down), where the at least one qubit circuit is arranged on the first surface (circuit plane) of the first quantum chip (10). The second quantum chip (20) is mounted on the second interposer substrate (40) with a second surface down, wherein the second surface is opposite to the first surface (circuit plane) on which the at least one qubit circuit is arranged. A connection terminal (11) on the first surface of the first quantum chip (10) and a connection terminal (21) on the first surface (circuit plane) of the second quantum chip (20), which is connected to the connection terminal (11), are in the same position on x-y plane and are relative to each other up and down.

The first quantum chip (10) may be configured to have a connection terminal (15) on at least a partial region of at least one side surface. The second quantum chip (20) may be configured to have a connection terminal (25) on at least a partial region of at least one side surface. When the first and second quantum chips (10, 20) are mounted on the first interposer substrate (30), the connection terminals (15, 25) on each of side surfaces of the first and second quantum chips (10, 20) may be of the same height.

The opposing connection terminals of the first and second quantum chips (10, 20) (11, 12 or 15, 25) may be configured to be connected by a conductive member. The connecting terminals (11, 12 or 15, 25) of the first and second quantum chips (10, 20) may be solder bonded or ultrasonically bonded in an opposed and contacted state.

The connection terminals (11, 12 or 15, 25) of the first and second quantum chips (10, 20) may be spaced apart and arranged opposite each other, and the connection terminals (11, 12 or 15, 25) of the first and second quantum chips (10, 20) may be configured to be capacitively or inductively coupled.

The connection terminals of at least one of the first and second quantum chips (10, 20) may be connected to opposing connection terminals of the interposer substrate (3) using a conductive material or electrically connected by a capacitive or inductor coupling. The interposer substrate (30) may be configured to include a qubit circuit.

In at least one of the first and second quantum chips (10, 20), the connection terminals (15, 25) may be configured to include a superconducting metal formed on a sidewall of a trench opened on a surface of a region that is a scribe line along a direction along the side surface in a wafer on which at least one of the first and second quantum chips (10, 20) is formed. In at least one of the first and second quantum chips (10, 20), the connection terminals (15, 25) may be configured to include a superconducting metal a portion of a superconducting metal (metal via) embedded in a via hole (blind via or through hole) opened on the surface of a region that is a scribe line along a direction of the side surface in a wafer on which at least one of the first and second quantum chips (10, 20) is formed.

The following describes several example embodiments with reference to the drawings. FIG. 1A illustrates one example embodiment (embodiment 1). Referring to FIG. 1A, a quantum device 1 includes a first quantum chip 10, a second quantum chip 20, an interposer substrate 30, and a package substrate 40. The package substrate 40 may also be referred to as an interposer substrate. In this case, the interposer substrate 30 may well be referred to as a first interposer substrate and a package substrate 40 as a second interposer substrate.

The first quantum chip 10 has a first surface (circuit plane) on which the qubit circuit 12 is arranged and a second surface (back surface) on a side opposite to the first surface. The first quantum chip 10 is mounted on the interposer substrate 30 with the first surface of the first quantum chip 10 down, wherein terminals of the first quantum chip 10 are aligned with terminals of the interposer substrate 30 opposing the first surface of the first quantum chip 10, That is, an unshown wiring on the first surface (front surface) of the first quantum chip 10 is electrically connected to an unshown wiring (pad) of the interposer substrate 30 via a protruded terminal (convex electrode, or bump) 31 located on the first surface (front surface) of the interposer substrate 30.

The first quantum chip 10, when mounted on the interposer substrate 30, has at least one side edge of its rectangular shape protruded more than an end portion (side edge) of the interposer substrate 30.

The second quantum chip 20 has a first face (circuit plane) on which the qubit circuit 22 is arranged and has a second surface (back surface) opposite to the first face. The second quantum chip 20 is mounted with terminals (not shown) on the second surface aligned with terminals (not shown) on an opposing package substrate 40 (face-up mounting). Wiring on the first surface (circuit plane) of the second quantum chip 20 is connected to terminals on the second surface via an unshown through-via or the like. The first quantum chip 10 and the second quantum chip 20 may each be configured with a plurality of qubit circuits on the first surface (circuit plane).

As a non-limiting example, the qubit circuits 12 and 22 include a resonator, an oscillator, a control circuit, and a readout circuit. The resonator includes a SQUID (Superconducting Quantum Interference Device (SQUID), in which superconducting materials are ring-connected via Josephson junctions. The control circuit controls a magnetic field applied to the resonator. The readout circuit reads out a resonant state (quantum two-level system) from the qubit circuit (resonator).

The interposer substrate 30 has a first surface (circuit plane) that connects to the first surface (front surface) of the first quantum chip 10 and a second surface (rear surface) opposite to the first surface. Wiring on the first surface (front surface) is connected to wiring on the second surface (back surface) via an unshown through-via(s). The wiring on the second surface (back surface) is connected to wiring on the first surface (back surface) of the package substrate 40, by a bump, etc.

The first face of the first quantum chip 10 protruded more than the end portion (side edge) of the interposer substrate 30 opposes the first face of the second quantum chip 20. The connection terminals 11 and 21 of the and second first quantum chips 10 and 20 are electrically connected. The interposer substrate 30 may, as a matter of course, be configured to have a qubit circuit.

Wiring on the first surface (circuit plane) of the second quantum chip 20 is connected to wiring (terminal) on the second surface via an unshown through-via or the like. The wiring (terminal) on the second surface wiring (terminal) of the second quantum chip 20 is connected to wring on a first face of the package substrate 40 via bumps or the like.

The connection between the first quantum chip 10 and the second quantum chip 20 via the connection terminals 11 and 12 may be a wireless connection such as capacitive coupling or inductor coupling, or may be solder bonding of metal (conductive member) such as convex electrodes or bumps.

Figure 1B:
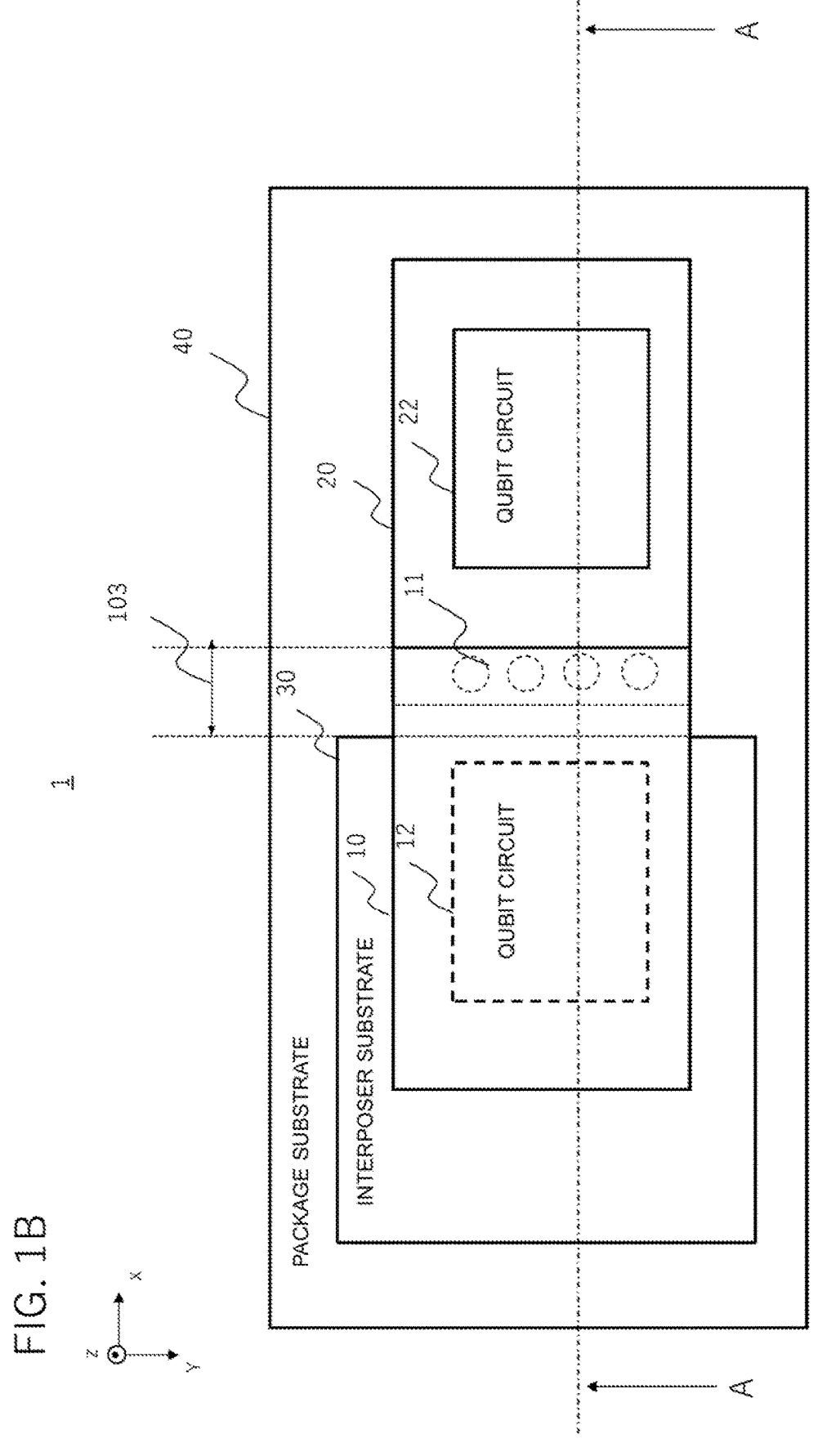
FIG. 1B is a plan view schematically illustrating a quantum device of one embodiment.

FIG. 1B is a schematic plan view of FIG. 1A from above. The first quantum chip 10 has a rectangular shape with the region 103 on at least one edge side protruded more than the end portion (side edge) of the interposer substrate 30.

Figure 1C:
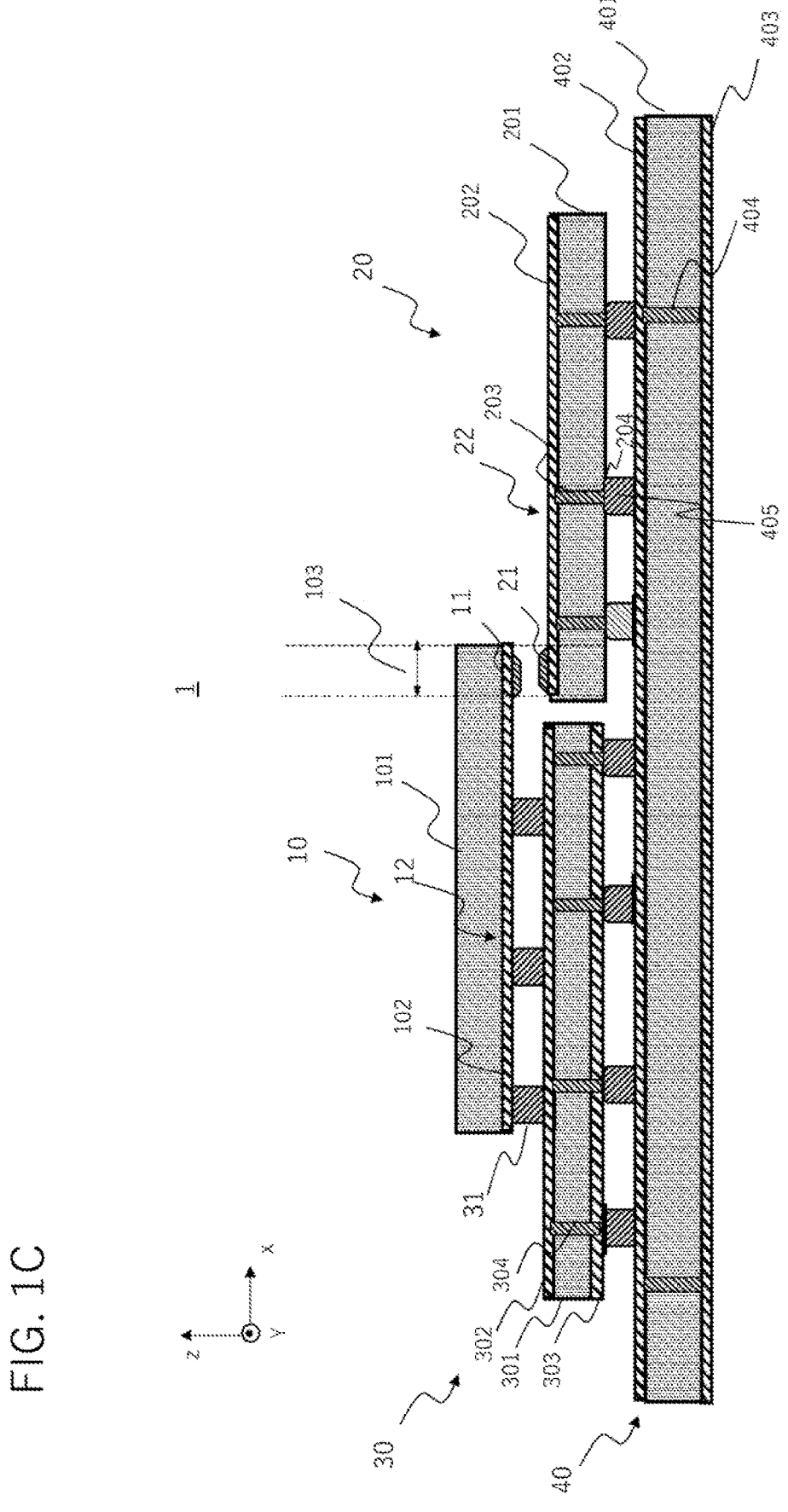
FIG. 1C is a schematic illustration of a side cross-section of a quantum device of one embodiment.
Figure 4A:
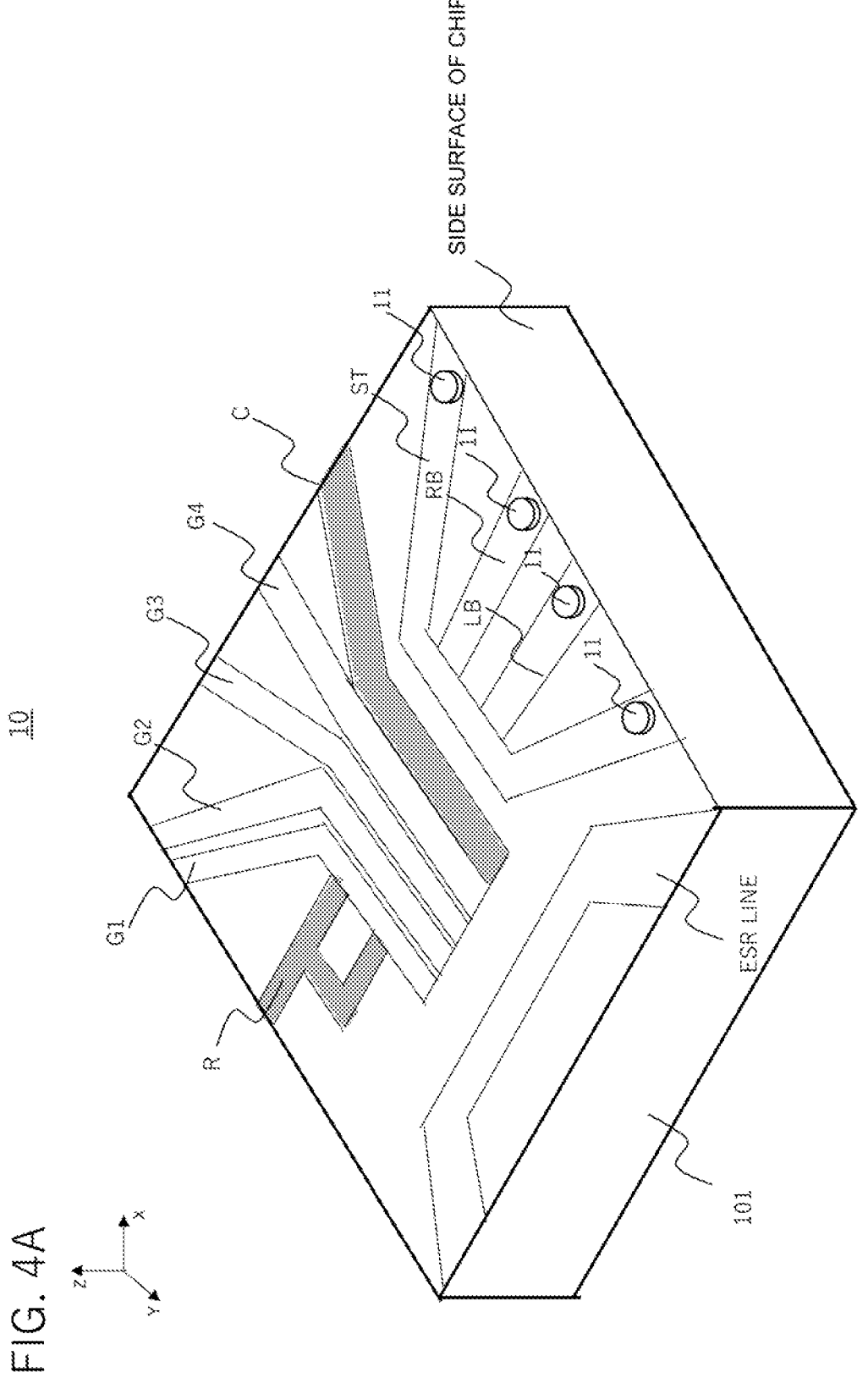
FIG. 4A is a diagram schematically illustrating an overview of an example of a silicon qubit chip.

FIG. 1C schematically illustrates a side section of an A-A line of FIG. 1B. A wiring layer (wiring plane) 102 on the first surface (circuit plane) of the substrate 101 of the first quantum chip 10 is provided with wirings constituting the qubit circuit 12 at predetermined locations. Wirings on the wiring layer 102 are connected to electrodes (bumps) 31 on a wiring layer (wiring plane) 302 of the interposer substrate 30 by solder bonding (superconductive solder). In addition, the wiring layer 102 on the first surface (circuit plane) of the substrate 101 of the first quantum chip 10 may include wirings arranged in a plurality of layers, as illustrated in FIG. 4A below.

The interposer substrate 30 has wiring layers (wiring planes) 302 and 303 on the first surface of the substrate 301 and the opposite second surface 302 and 303, respectively. Wirings of the wiring layer 302 on the first surface (signal wiring/ground wiring (pattern)) and the corresponding wirings of the wiring layer 303 on the second surface (signal wiring/ground wiring (pattern)) are connected by through vias 304. The wirings of the wiring layer 303 on the second surface of the interposer substrate 30 are connected to corresponding wirings of a wiring layer (wiring plane) 402 on a first surface of the substrate 401 of the package substrate 401 via bumps 405, etc. The wiring layer 403 on the second surface of the substrate 401 of the package substrate 403 may have a wiring pattern or be a ground plane. In other words, the package substrate 40 may have the wiring layer 403 of the second face of the package substrate 40 connected to an unshown other substrate (such as Printed Circuit Board (PCB). Alternatively, the wiring layer 403 on the second surface of the package substrate 40 may be a ground plane, and placed, for example, on a pedestal (base) (not shown) made of conductive material.

In the example of FIG. 1C, the connection terminal 11 provided on the wiring layer 102 of the first surface (circuit plane) of the first quantum chip 10 and the connection terminal 21 provided on the wiring layer 202 of the first surface (circuit plane) of the second quantum chip 20 are located at the same position on the x-y 2 dimensional coordinate plane with positions in a z-axis direction separated by a predetermined interval, and signals are transmitted and/or received by capacitive coupling or inductor coupling. In FIG. 1C, the connection terminals 11 and 21 are schematically illustrated as convex electrodes formed on the wiring of the wiring layers 102 and 202, respectively. But the connection terminals 11 and 21 are not limited to convex electrodes. For example, the connection terminals 11 and 21 may be wiring pads. A through vias 203 penetrating through the first surface (circuit plane) and the second surface (back surface) of the second quantum chip 20 are provided. The wiring of the wiring layer 202 on the first surface of the second quantum chip 20 is connected via the through-via 203, a via pad 204 on the second surface of the second quantum chip 20 (via pad of the through-via 203), and a bump 405 to the wiring layer 402 on the first surface of the substrate 401 of the package substrate 40.

As a non-limiting example, the interposer substrate 30 and the second quantum chip 20 preferably have the same or nearly the same thicknesses.

The substrates 101, 201, 301 and 401 of the first quantum chip 10, the second quantum chip 20, the interposer substrate 30, and the package substrate 40 are preferably made of a material having the same coefficient of thermal expansion. As a non-limiting example, in case where these substrates are silicon (Si), high-resistance silicon of 10 kΩcm (kiloohm centimeter) or higher is suitable, and a high resistance of 20 kΩcm or higher is more preferable. In addition to silicon, other electronic materials such as sapphire and compound semiconductor materials (Group IV (GeSn, etc.), Group III-V (GaAs, GaN, GaP, GaSb, InAs, InP, InS, etc.), Group II-VI (ZnS, ZnSe)) may be used for these substrates. Single crystal is preferable, but polycrystalline or amorphous is also acceptable.

The superconducting circuits, qubit circuits 12 and 22, are composed of superconducting materials such as niobium (Nb). The superconducting materials are not limited to niobium (Nb), but may include niobium nitride, aluminum (Al), indium (In), lead (Pb), tin (Sn), rhenium (Re), palladium (Pd), titanium (Ti), tantalum (Ta), tantalum nitrides, and an alloy including at least one of these.

The wirings on the opposing surfaces of the second quantum chip 20, interposer substrate 30, and package substrate 40 have through vias 203, 304, and 404 (When substrates 201, 301, and 401 are Si Through Silicon Via: TSV).

Connection between the first quantum chip 10 and interposer substrate 30, between the interposer substrate 30 and package substrate 40, and between the second quantum chip 20 and package substrate 40 can be wireless (capacitive coupling, inductor coupling, etc.) or a metal member (convex electrodes, bumps, wire bonding, etc.). However, this does not preclude mounting examples using solder bumps instead of metal bumps. In FIG. 1C, through vias connecting signal/ground wiring (patterns) on the first surface of the substrate and signal/ground wiring (patterns) on the second surface are schematically illustrated to explain the configuration. The number and arrangement of the through vias are not intended to limit the embodiment. Similarly, the number and arrangement of bumps are not intended to limit the embodiment. In FIG. 1C, in the schematic side cross-sectional view of the substrates 101, 201, 301, and 401, wiring layers are illustrated in place of individual wires. The same is true for the other schematic side cross sectional views which will be referred to below.

Figure 1D:
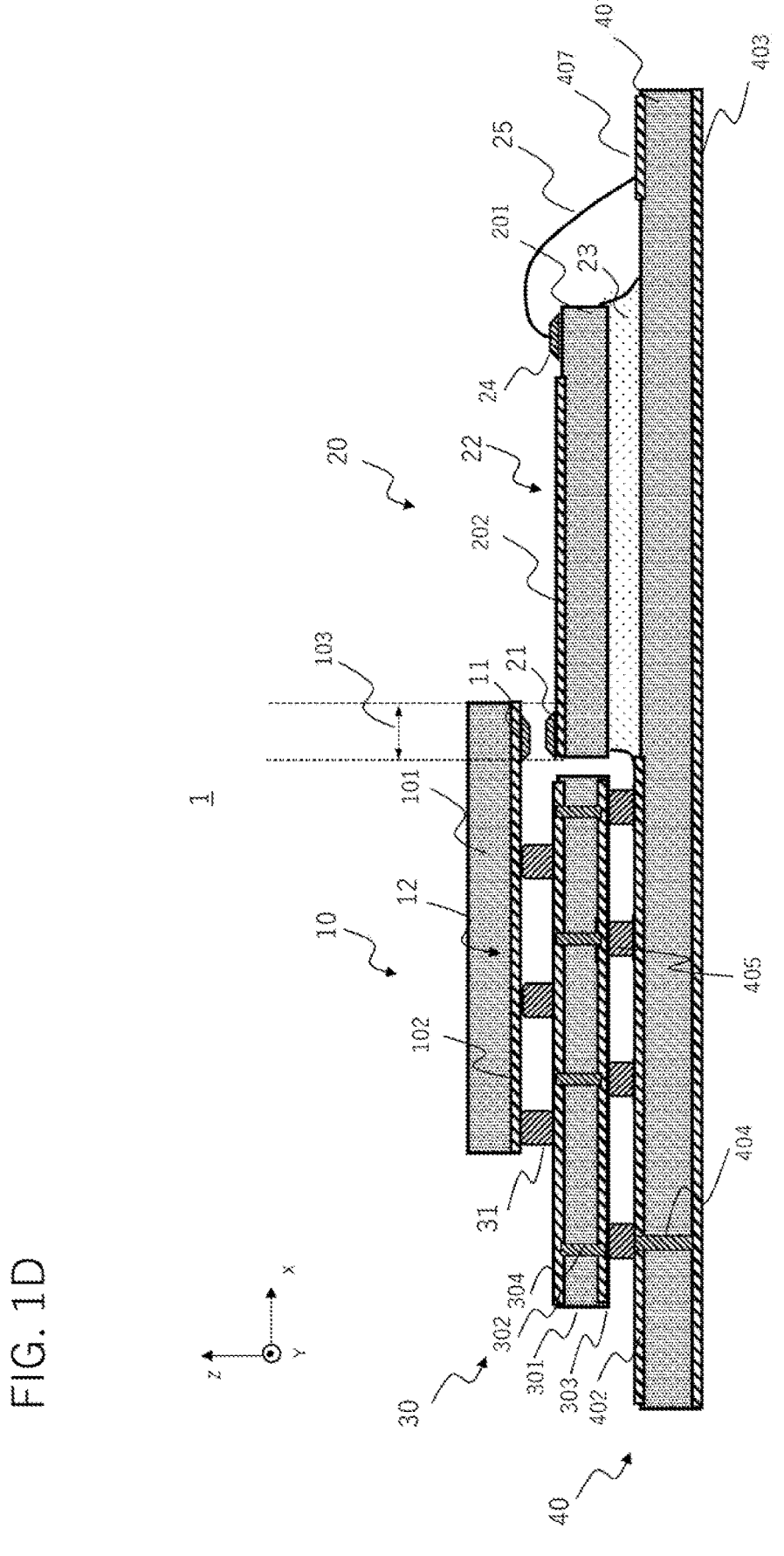
FIG. 1D is a schematic diagram of a side cross-section of a quantum device of one embodiment.

In the example of FIG. 1D, the second surface (back surface) of the second quantum chip 20 is fixed to the first surface of the package substrate 40 with a resin (die bond material) 23. The wiring pad 24 on the first surface (circuit plane) of the second quantum chip 20 is wire-bonded to a wiring pad 407 provided on the package substrate 40 with a superconducting metal wire 25. In FIG. 1D, only one location is schematically illustrated as wire bonding for simplicity, but there can be, as a matter of course, a plurality of bonding locations with metal wires. In place of die bond mounting, the second surface (back surface) of the second quantum chip 20 can be mounted on the package substrate 40 using bumps. The wiring pads 24 on the first surface (circuit plane) of the second quantum chip 20 and a pad of the wiring layer of an interposer substrate 30 are roughly of the same height (e.g., an unshown pad of the wiring layer 302 on the first face of the interposer substrate 30 mounted on package substrate 40 or an interposer substrate (not shown) mounted at the same height) may be connected by a superconducting metal wire (bonding wire).

Figure 1E:
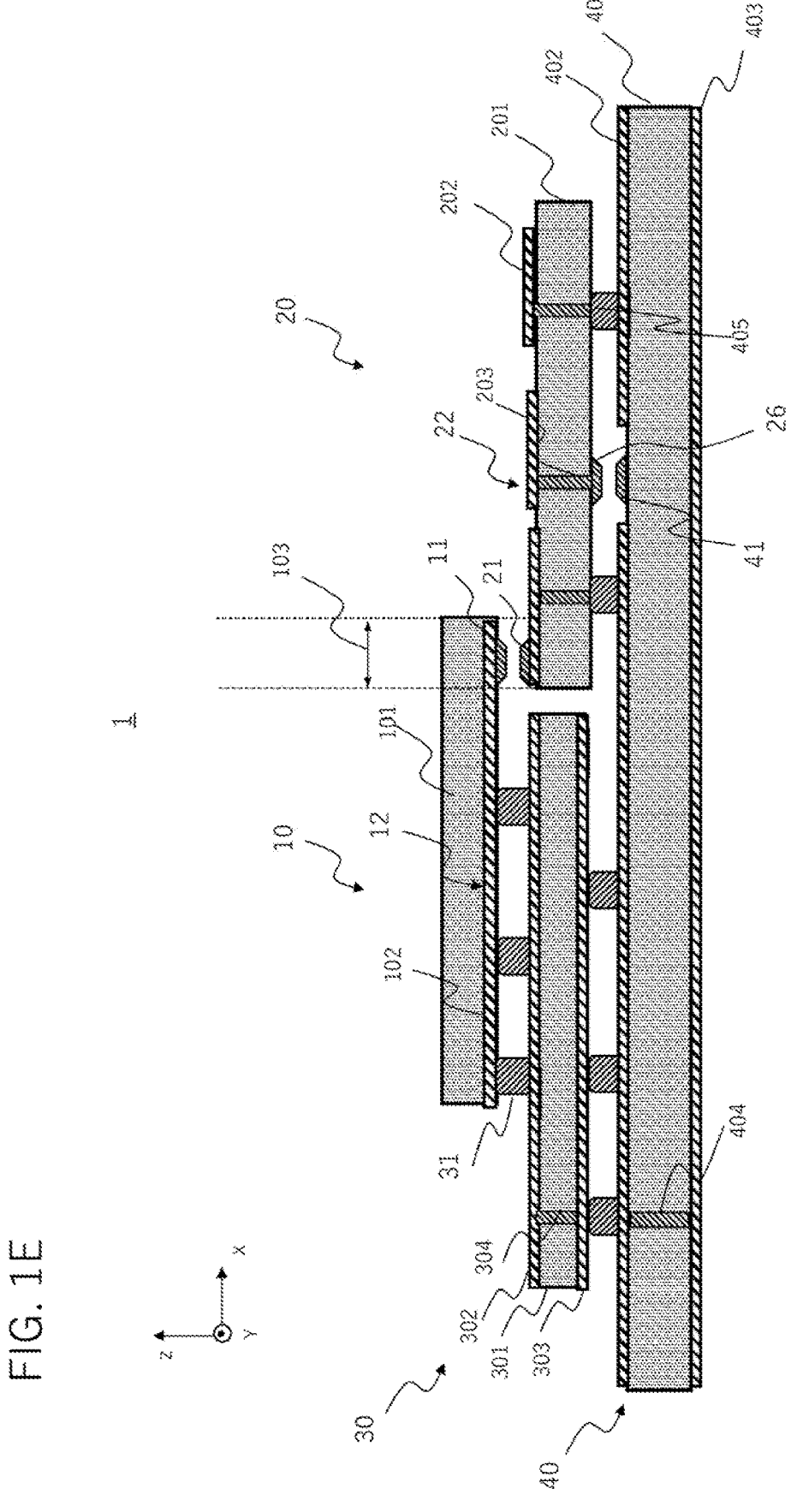
FIG. 1E is a schematic diagram schematically illustrating a cross-section of a quantum device of one embodiment.

In the example of FIG. 1E, wiring of the qubit circuit 22 on the first surface of the second quantum chip 20 is connected to the connection terminal 26 on the second surface via a through via 203. The connection terminal 26 is spaced apart from a connection terminal 41 on the first surface of the package substrate 40 by a predetermined interval and is located opposite to the connection terminal 41 on the first surface of the package substrate 40. The connection terminals 26 and 41 arranged opposite to each other and are capacitively or inductively coupled. Regarding predetermined connection terminals between the first quantum chip 10 and the interposer substrate 30, and between the interposer substrate 30 and the package substrate 40, as well as between the connection terminals 26 and 41, instead of wired connection such as bump connection, etc., signals may be transmitted by wireless connection (capacitive or inductor coupling).

Figure 2A:
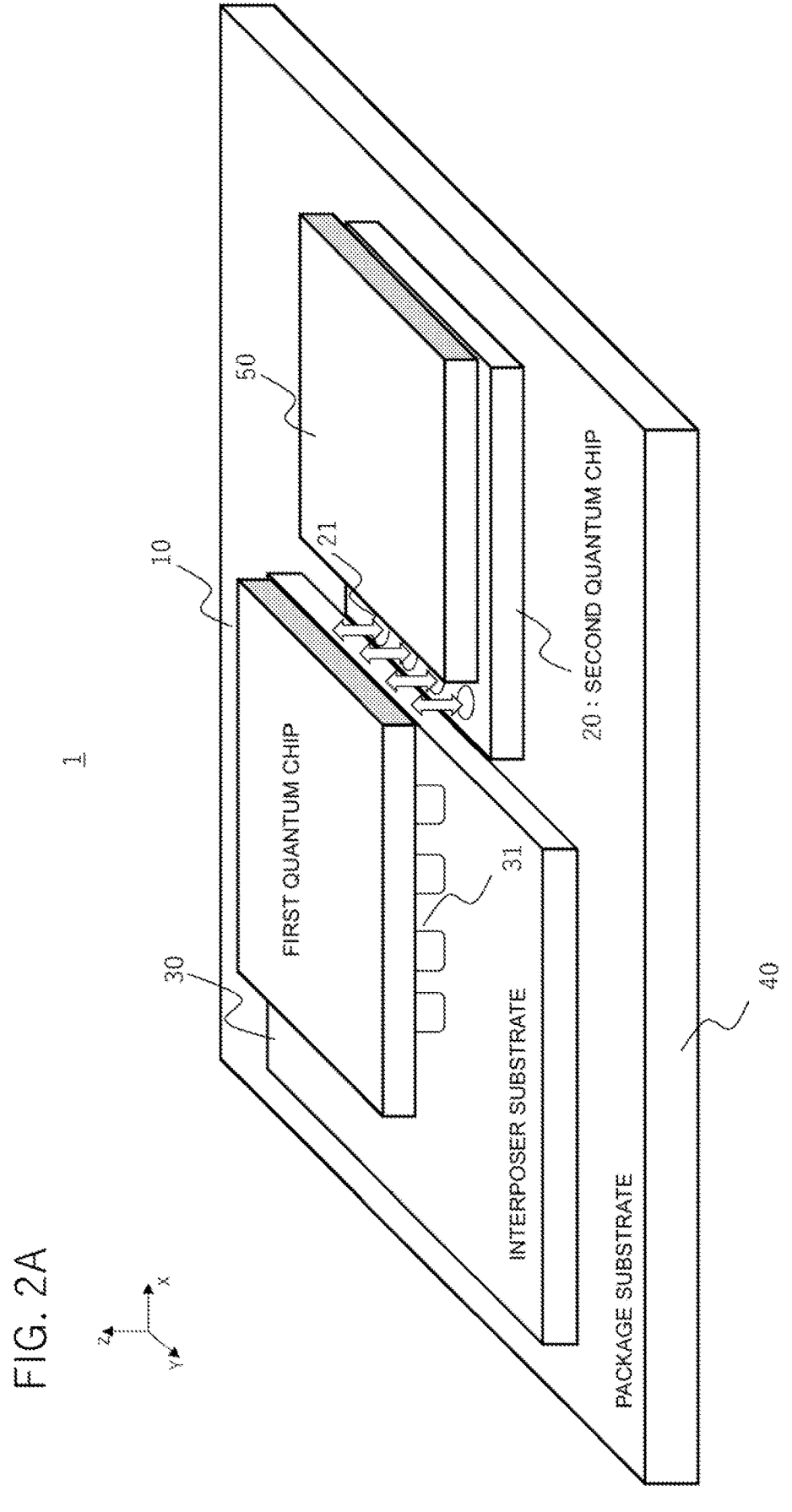
FIG. 2A is a schematic diagram schematically illustrating an overview of a variant of the quantum device of one embodiment.
Figure 2B:
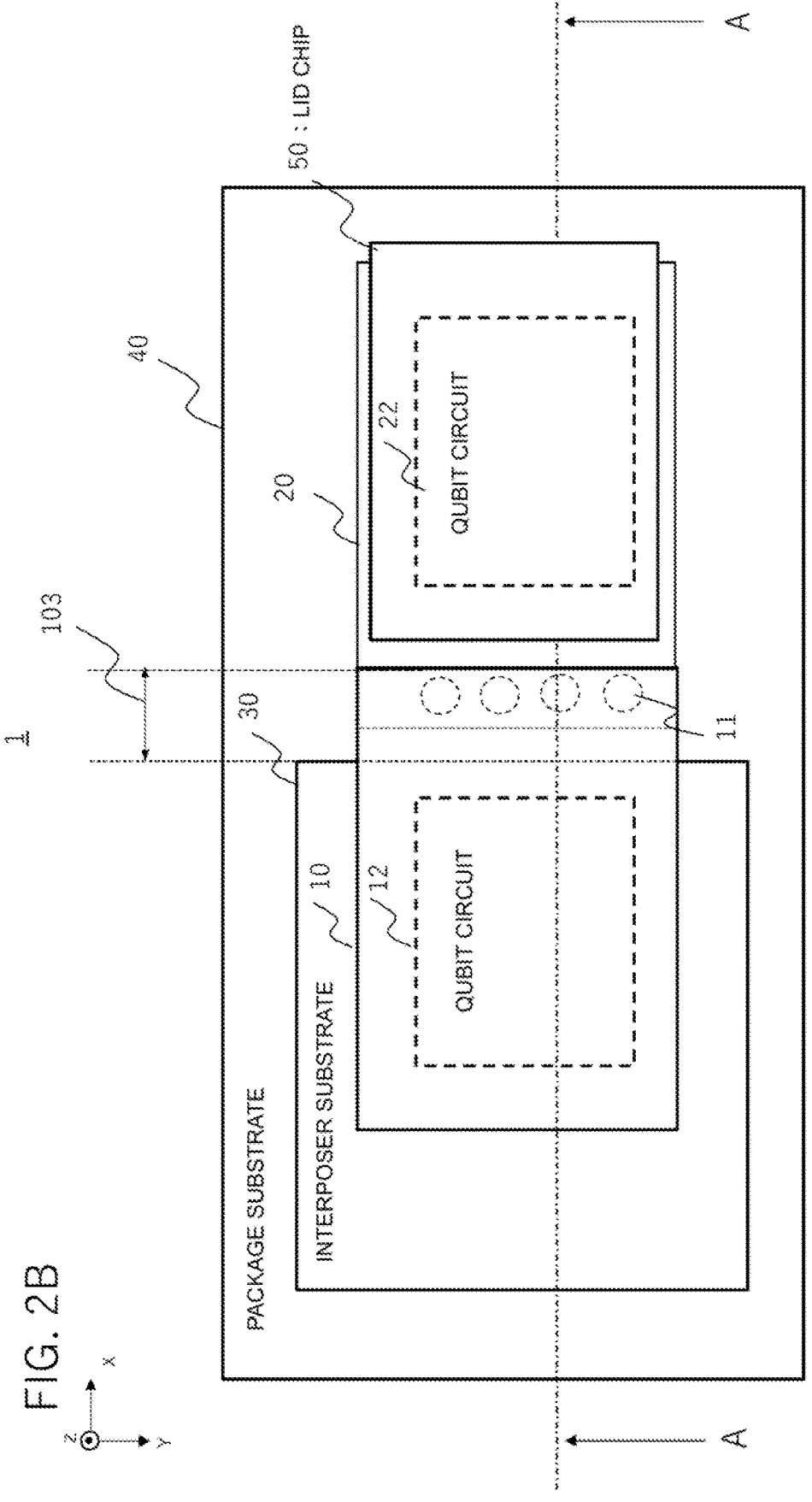
FIG. 2B is a plan view schematically illustrating a variant of the quantum device of one embodiment.
Figure 2C:
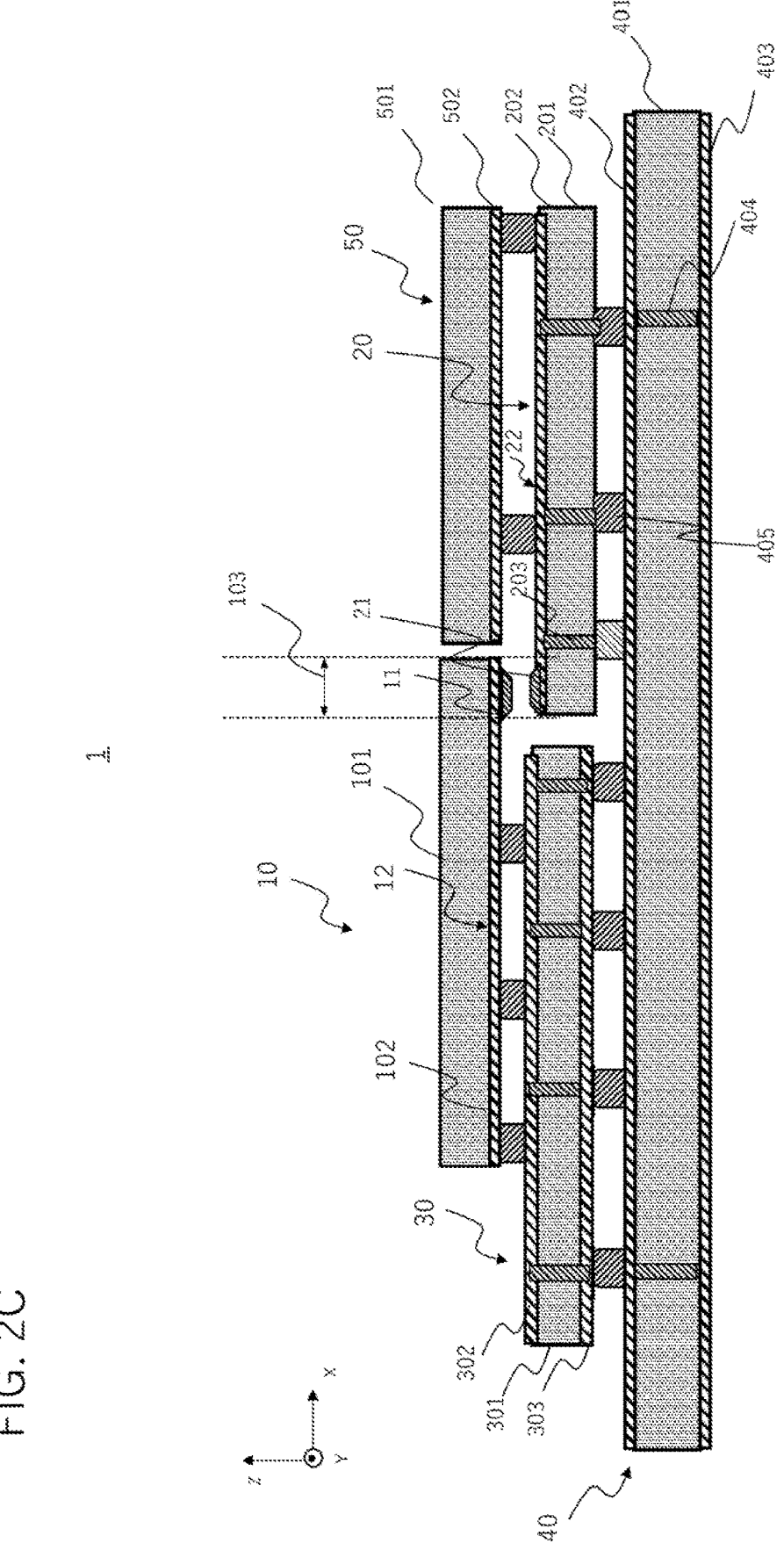
FIG. 2C is a schematic illustration of a side cross-section of a quantum device of a variant of one embodiment.

As a variation of the embodiment, as illustrated in FIG. 2A, a lid chip 50 for external magnetic field protection (magnetic shielding) on top of the second quantum chip 20 may be mounted. FIG. 2B is a schematic plan view of FIG. 2A from above. FIG. 2C schematically illustrates a side section along line A-A of FIG. 2B. The chip 50 has a ground plane for magnetic shielding on a surface opposite to the first surface (circuit plane) of the second quantum chip 20. The ground plane of the lid chip 50 may include a superconducting material, copper (Cu), or Au. The superconducting material may include niobium (Nb), niobium nitride, aluminum (Al), indium (In), lead (Pb), tin (Sn), rhenium (Re), palladium (Pd), titanium (Ti), and tantalum (Ta), tantalum nitride, and alloys containing at least one of these. A size (area) of the chip 50 can be larger or smaller than that of the second quantum chip 20, so long as a circuitry of the second quantum chip 20 is protected.

In this way, on the circuit plane where the qubits of the first quantum chip 10 and the second quantum chip 20 are provided, there is provided an overlapping region 103 in which portions of the first quantum chip 10 and the second quantum chip 20 are opposite to each other and overlap each other up (above) and down (below). The respective connection terminals 11 and 21 provided in the region 103 opposing each other up and down are wirelessly connected or wired-connected by metal members.

According to the present embodiment, a plurality of quantum chips (i.e., the first and second quantum chips 10 and 20), the interposer substrate 30, and the package substrate 40 are arranged in a stacked structure, which makes it possible to control to reduce a characteristic variation due to yield reduction and pseudo-errors (conductor thinning and swelling), etc.

Figure 3A:
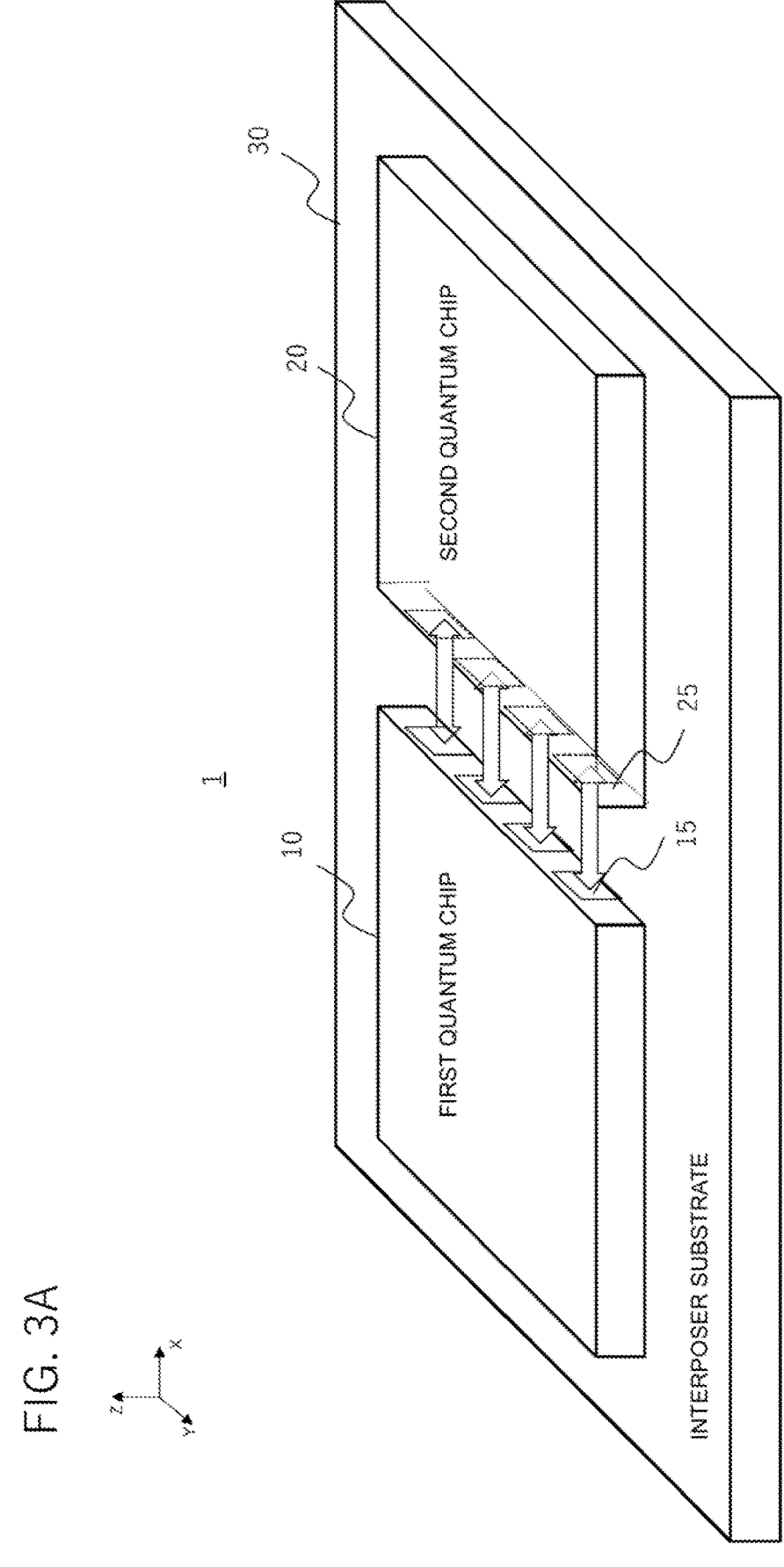
FIG. 3A is a diagram schematically illustrating an overview of a quantum device of another embodiment.
Figure 3B:
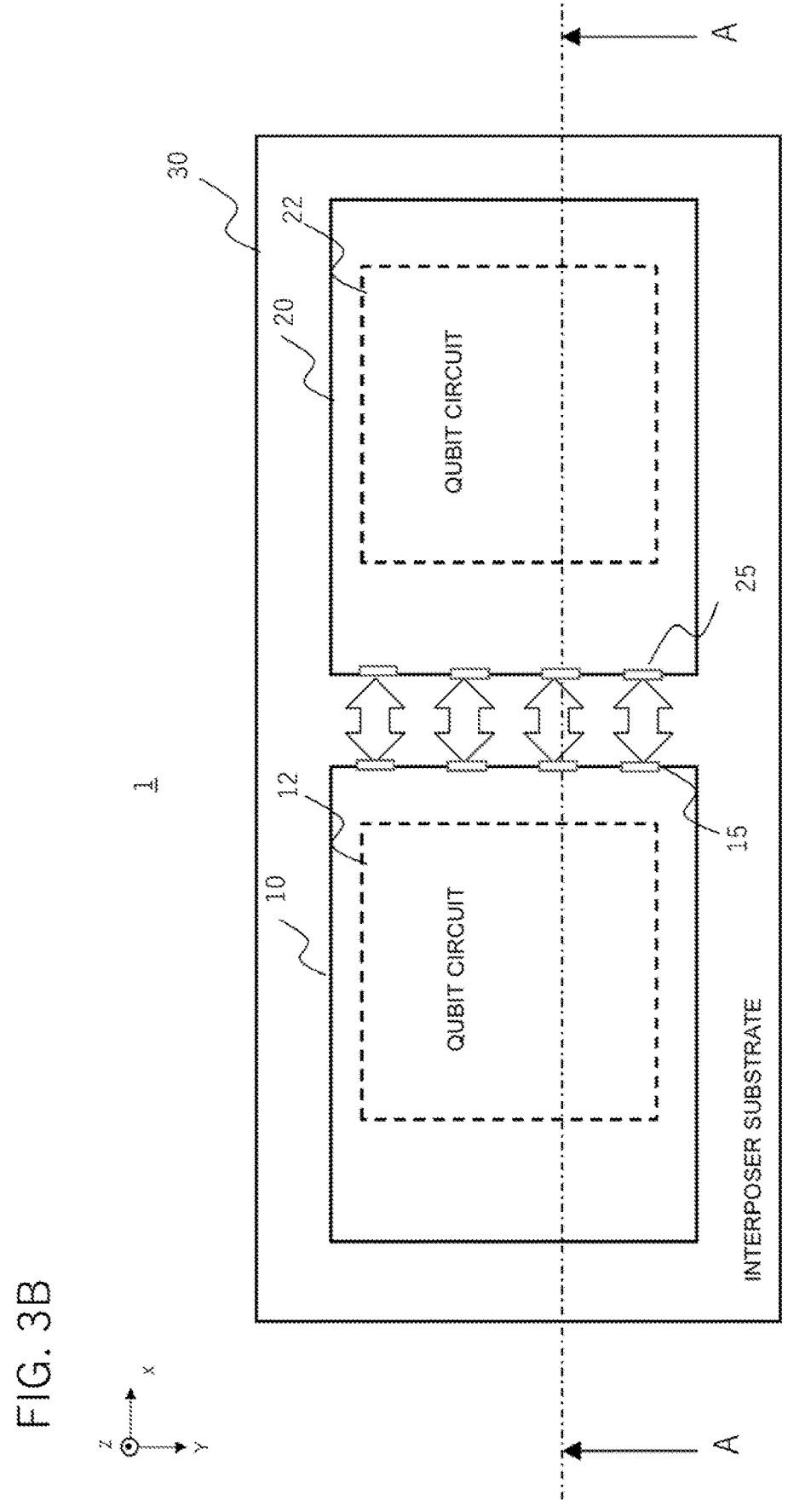
FIG. 3B is a plan view schematically illustrating a quantum device of another embodiment.
Figure 3C:
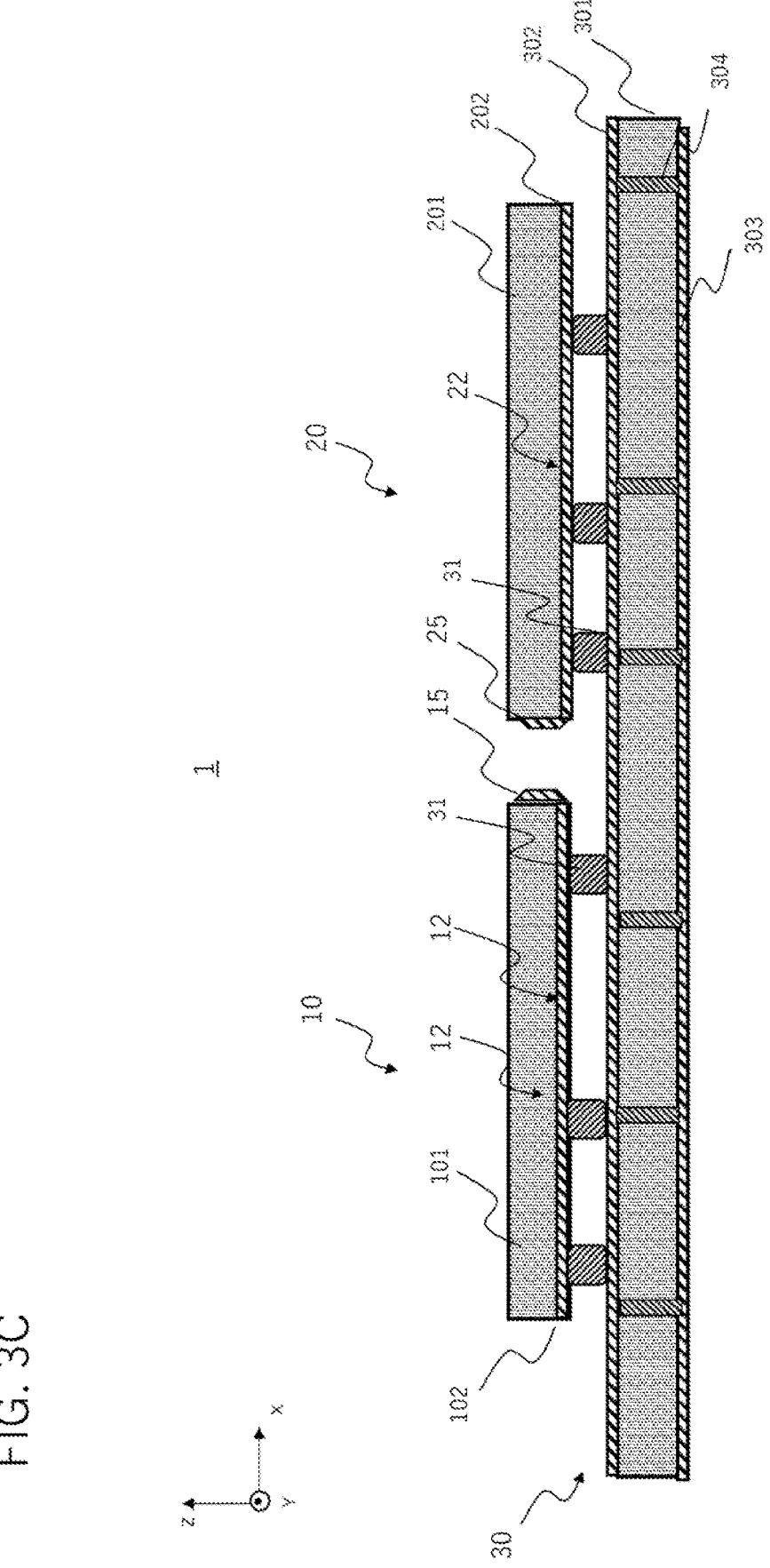
FIG. 3C is a schematic illustration of a side cross-section of a quantum device of another embodiment.

FIG. 3A schematically illustrates another embodiment (embodiment 2). FIG. 3B is a schematic plan view of FIG. 3A from above. FIG. 3C schematically illustrates a side section (side end face) along the A-A line of FIG. 3B.

According to the present embodiment, connection between the terminals of the first and second quantum chips 10 and 20 is made by connection terminals (side terminals) 15 and 25 provided respectively on sides of the second quantum chips 10 and 20. This makes it possible to improve power loss and superimposed noise.

As illustrated in FIGS. 3B and 3C, the side terminals 15 and 25 provided respectively on the side surfaces of the first and second quantum chips 10 and 20 have identical y-axis coordinate values in the x-y plane and have identical z-axis coordinates values (or nearly identical). The connection of the side terminals 15 and 25 may be a wireless connection such as capacitive coupling or inductor coupling with the side terminals 15 and 25 arranged apart from each other, or a solder joint of metal members (superconducting metal) such as convex electrodes or bumps that make up the side terminals 15 and 25. In other words, tips of the convex electrodes and bumps of the side terminals 15 and 25 may be brought into contact with each other and joined by solder bonding, thermocompression bonding, or the like.

The first and second quantum chips 10 and 20 are mounted with the first surface (circuit plane) having the qubit circuitry faced downwards on an interposer substrate 30 (flip chip mounting). More specifically, wirings of wiring layers 102 and 202 on the first surface (circuit plane) of the first and second quantum chips 10 and 20 are solder-joined to bumps 31 on wiring pads provided at predetermined locations of a wiring layer 302 on the first surface of the interposer substrate 30. Wirings of the wiring layer 302 on the first surface of the interposer substrate 30 (signal wiring/ground wiring (pattern)) and corresponding wirings (signal wiring/ground wiring (pattern)) of a wiring layer 303 on the second surface (opposite side of the first surface) are connected by through vias 304. The wiring layer 303 on the second surface of the interposer substrate 30 may be configured to have bumps for connection to other interposer substrates or PCB (Printed Circuit Board), not illustrated in the figure. The wiring layer 303 may be configured as a ground plane.

In FIGS. 3A-3C, the first and second quantum chips 10 and 20 are mounted in same on a single interposer substrate 30. However, there may be provided a plurality of interposer substrates 30. In this case, there may be provided a package substrate configured to mount a plurality of interposer substrates 30, as in the embodiment described above.

Connection between the interposer substrate 30 (package substrate) and each of the first and second quantum chips 10 and 20 may be wireless (capacitive coupling, inductor coupling, etc.) or use metal members (convex electrodes, bumps, wire bonding, etc.).

The side terminals 15 and 25 of the first and second quantum chips 10 and 20 each face-down mounted on the interposer substrate 30 need only be able to face each other at an identical (or nearly identical) height (in z-axis direction). Thicknesses of the first and second quantum chips 10 and 20 may be the same or different so long as the side terminals 15 and 25 of the first and second quantum chips 10 and 20 face each other.

As in the embodiment described above, the substrates of the first and second quantum chips 10 and 20 and the substrate of the interposer substrate 30 preferably have the same coefficient of thermal expansion (Si, GaAs, sapphire, glass, etc.).

The side terminals 15 and 25 of the first and second quantum chips 10 and 20 preferably have a ground terminal adjacent to a signal terminal.

In order to improve an alignment accuracy of the side terminals 15 and 25 of the first and second quantum chips 10, 20, a guide hole (positioning adjustment hole) defining a mounting position may be provided in the first and second quantum chips 10 and 20 or peripheral processing of the chips may be applied (e.g., cutting four corners of the quantum chips may be applied when positioning guide members are provided on the interposer substrate 30 at locations corresponding to four corners of each chip).

FIG. 4A schematically illustrates an example of application of one of the above described embodiment (Embodiment 1) to a silicon qubit chip (a in FIG. 1 of NPL 2). In FIG. 4A, G1-G4 are quantum dot gate electrodes, R is a reservoir, and C passes under G2-G4 and confines the quantum dot on all edges(sides) except for the reservoir R. In a single-quantum dot mode, the quantum dot is tunnel-coupled to the reservoir R through G3 under G4. ST, RB and LB are data-read circuit of a single electron transistor (SET) which reads the qubit as a current detector detecting whether a current flows or not. The qubit is written or calculated by applying an alternating current $I_{ESR}$ to the ESR electrode. The chip is placed in a refrigerator and kept at a cryogenic temperature. In the example illustrated in FIG. 4A, the silicon qubit chip (corresponding to the first quantum chip 10) is equipped with connection terminals (electrodes) 11 in wirings of a circuit for reading data from the SET. The connection terminal (electrodes) 11 are illustrated as convex electrodes with a circular planar shape, only for simplicity, but the planar shape may be rectangular or the like. The plurality of connection terminals (electrodes) 11 may all be convex electrodes, bumps, etc., all may be electrodes for wireless connection or some may be convex electrodes, bumps, etc. and the rest may be electrodes for wireless connection.

Figure 4B:
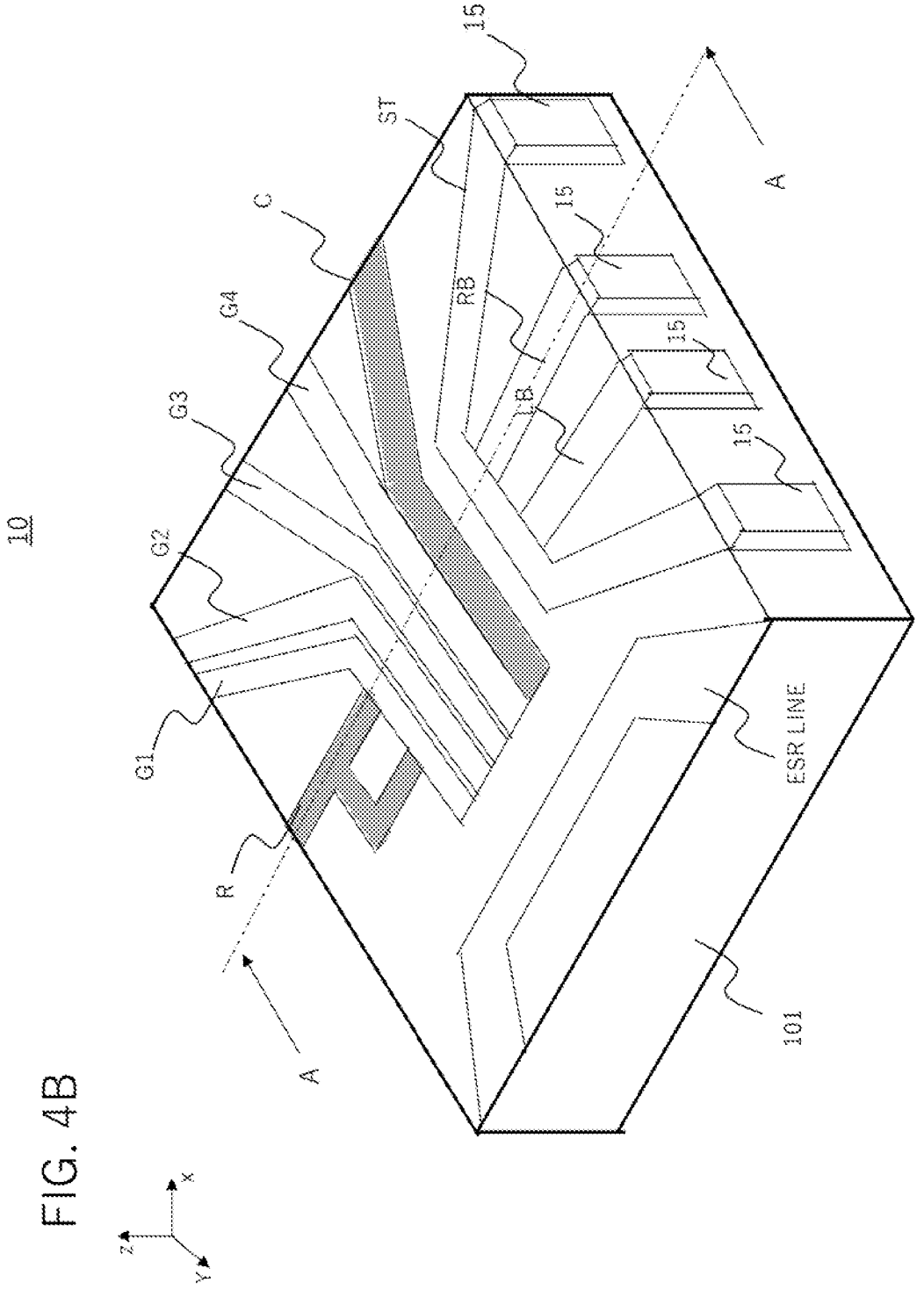
FIG. 4B is a diagram schematically illustrating an overview of an example of another embodiment applied to the silicon qubit chip.

FIG. 4B schematically illustrates an example in which another embodiment (Embodiment 2) is applied to a silicon qubit chip (a in FIG. 1 of NPL 2). A connection terminal (side terminal) 15 is provided on a side of the silicon qubit chip, instead of the connection terminal 11 on the first surface (circuit plane) of the silicon qubit chip illustrated in FIG. 4A. In FIG. 4B, a wiring of the circuit for reading data from SET is connected to the side terminal 15, which is connected to a side terminal of another silicon qubit chip (second qubit chip 20) not illustrated in the figure. The side terminals (electrodes) 15 are illustrated as rectangular-shaped convex electrodes, only for simplicity, but may be circular or other shapes. The plurality of connection terminals (electrodes) 15 located on the sides may all be convex electrodes, bumps, etc., all may be electrodes for wireless connection, some may be convex electrodes, bumps, etc., and the rest may be electrodes for wireless connection, etc.

FIGS. 5A to 5D schematically illustrate an example of manufacturing processes of the quantum chip of the second embodiment.

Figure 5A:
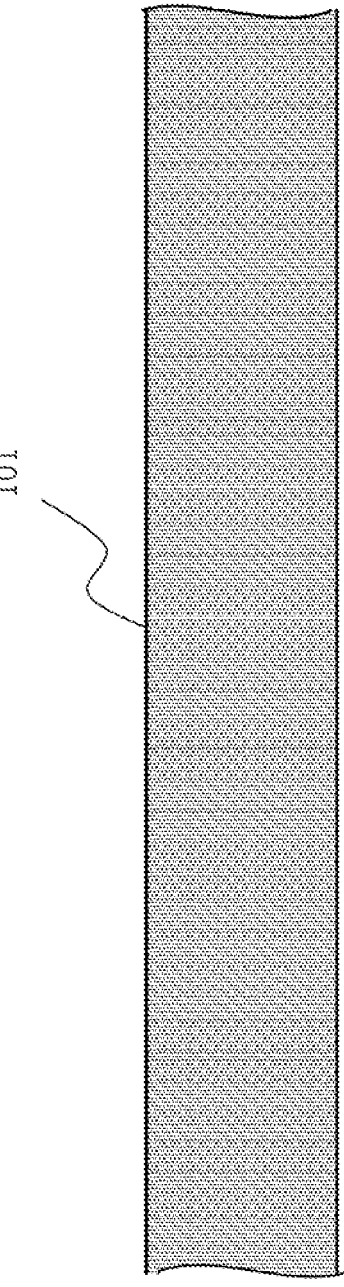
FIG. 5A is a schematic diagram illustrating a manufacturing process of another embodiment.
Figure 5B:
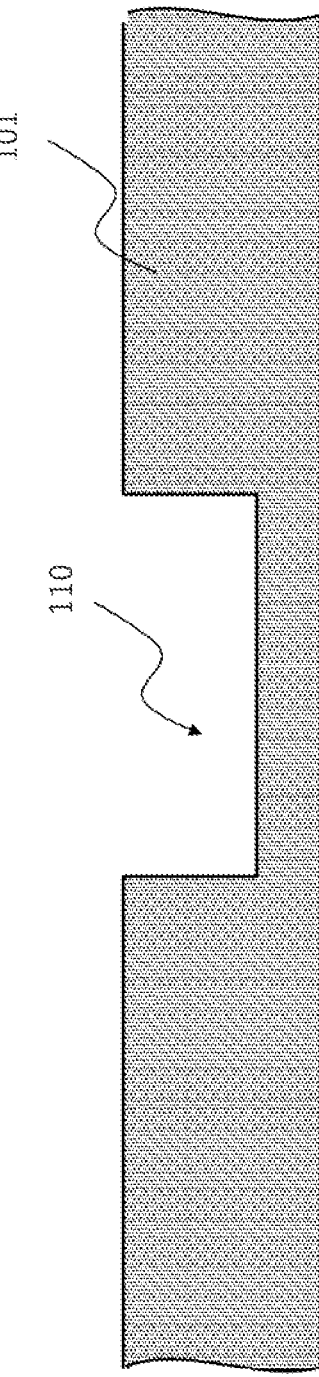
FIG. 5B is a diagram schematically illustrating the manufacturing process of another embodiment.
Figure 5C:
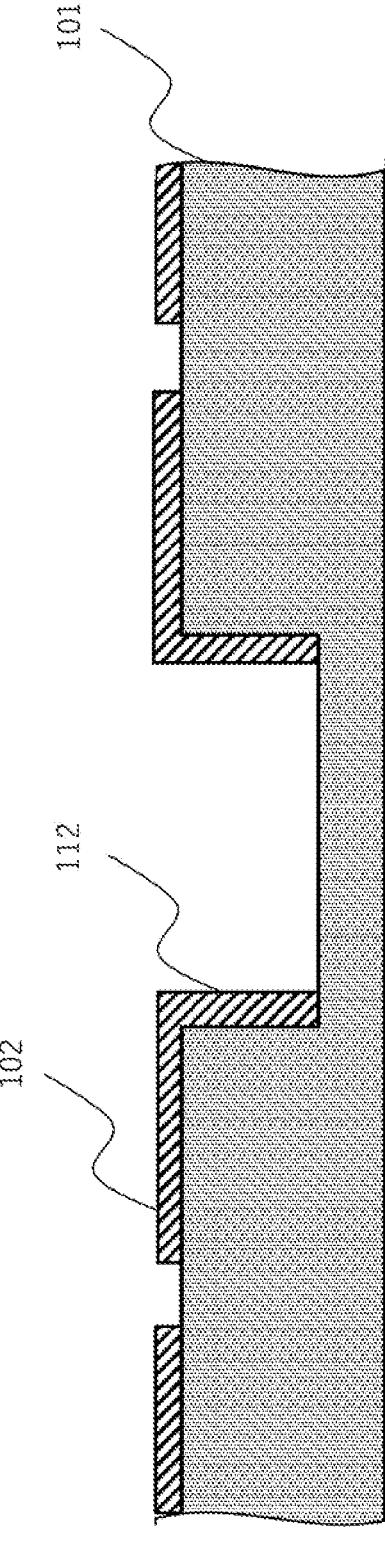
FIG. 5C is a diagram schematically illustrating the manufacturing process of another embodiment.
Figure 5D:
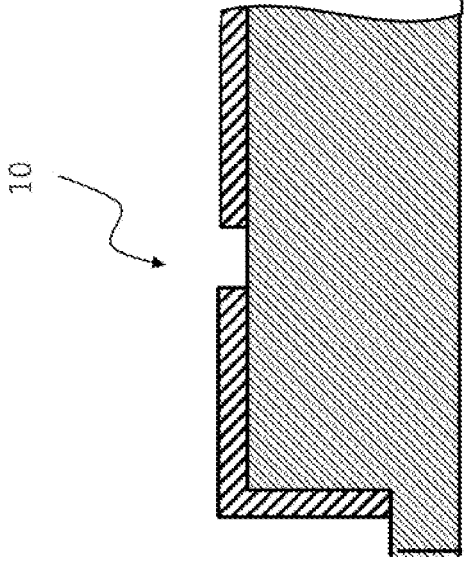
FIG. 5D is a diagram schematically illustrating the manufacturing process of another embodiment.
Figure 5D:
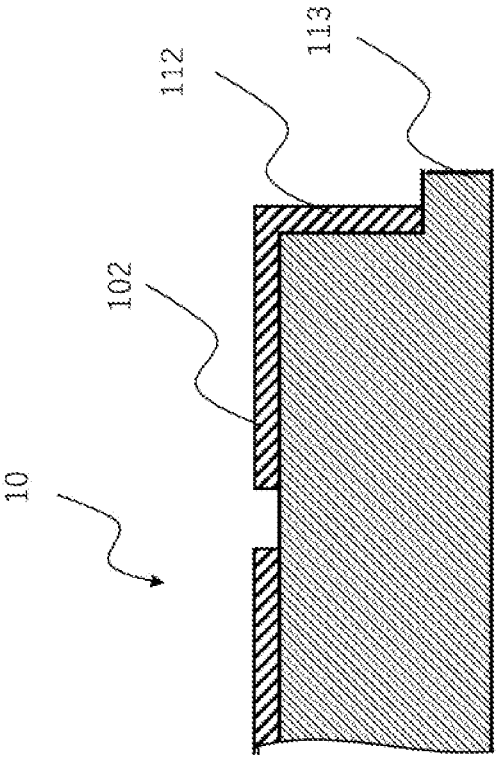

For the silicon substrate 101 (wafer) as illustrated in FIG. 5A, a process of forming a trench 110 on a surface of a scribed area of an outer circumference portion corresponding to the side surface of the first quantum chip 10 in FIG. 5B, a process of forming a connection terminal 112 (FIG. 5C) on a side surface of the trench 110 in FIG. 5C (corresponding to a side terminal 15 in FIG. 3C), and a process of cutting at a scribe region (scribe line) inside trench 110 in FIG. 5D. The chip 10 cut and separated in FIG. 5D corresponds to the cross section along line A-A in FIG. 4B.

In the process of FIG. 5B, the trench 110 is formed on the surface of the silicon substrate 101 (wafer) in an area of the scribe line along the side where the side terminal of the first quantum chip 10 is formed (a line width of the scribe line is not particularly limited and is on the order of 100 μm (micrometer), for example). In trench fabrication, an etching process usually takes a long time. For this reason, a resist as a mask is degraded and results in non-uniform dimensions. For this reason, a layer of silicon oxide film ($SiO_2$), for example, is formed on the silicon substrate 101 and patterned using a resist to form a $SiO_2$ pattern as a mask (hard mask). Processing of the trench 110 on the side surface of the first quantum chip 10 requires vertical anisotropy, so dry etching which performs etching only in a specific direction is used.

In the process of forming the side terminals in FIG. 5C, the connection terminal 112 on the side surface of the trench 110 may be formed by coating the side surface of the trench 110 with a superconducting metal film by sputtering (or plating) or the like. Thereafter, patterning may be performed.

In FIG. 5C, for simplicity, the wiring layer 102 on the first surface (circuit plane) of the silicon substrate 101 and the connection terminal 112 on the side surface of the trench are illustrated for simplicity. The formation of the wiring layer 102 on the first surface (circuit plane) of the silicon substrate 101 and the connection terminal 112 on the side surface of the trench are illustrated in FIG. 5C, only for simplicity. The formation of the wiring layer 102 on the first surface (circuit plane) and the formation of the connection terminals 112 on the side surface of the trench are usually done in separate processes. However, if the wiring layer 102 consists of a plurality of layers, patterning of the wiring on the topmost layer and formation of the connection terminal 112 on the side surface of the trench may be performed simultaneously. The formation of the connection terminal 112 on the side surface of the trench 110 may be performed by using a lift-off method including: coating a photoresist on the silicon substrate 101, forming a photoresist pattern by exposure and development, and depositing a superconducting material on an entire surface, and then peeling off the photoresist by using a resist-peeling liquid. Alternatively, a superconducting metal film is deposited on a silicon substrate 101 by sputtering, etc., a photoresist pattern is formed on the superconducting metal film, a wiring pattern is formed by dry etching or wet etching, and then the photoresist is peeled off and removed.

In the dicing process of the wafer in FIG. 5D, a dicer method using a dicing blade, a laser method, an etching method using dry etching and so forth may be used. In the dicer method, the silicon substrate 101 is attached to a glue side of a dicing tape (not shown) and is cut along a dicing street (a scribe line crossing the trench 110) using a dicing blade not shown. After dicing, the dicing tape is cleaned, and the glue agent on the dicing tape is cured by UV (ultraviolet) irradiation to reduce its adhesive strength, and the dicing tape is stretched to detach the first quantum chip 10.

A protruding portion 113 immediately below the side terminal 15 of the first quantum chip 10 (a bottom portion of the trench 110 after dicing) may be processed to reduce its thickness by polishing an entire back surface of the silicon substrate 101 (wafer) such that the side terminal 112 of the first quantum chip 10 have the same thickness of the first quantum chip 10. The protruding portion 113 directly below the side terminal 112 may be left as it is or machined around a periphery and used as a positioning means to accurately position the chip having the opposite side terminal. The second quantum chip 20 is manufactured in the same manner as the first quantum chip 10 described above.

FIGS. 6A to 6D schematically illustrate another example of the manufacturing process of the quantum chip of the second embodiment.

Figure 6A:
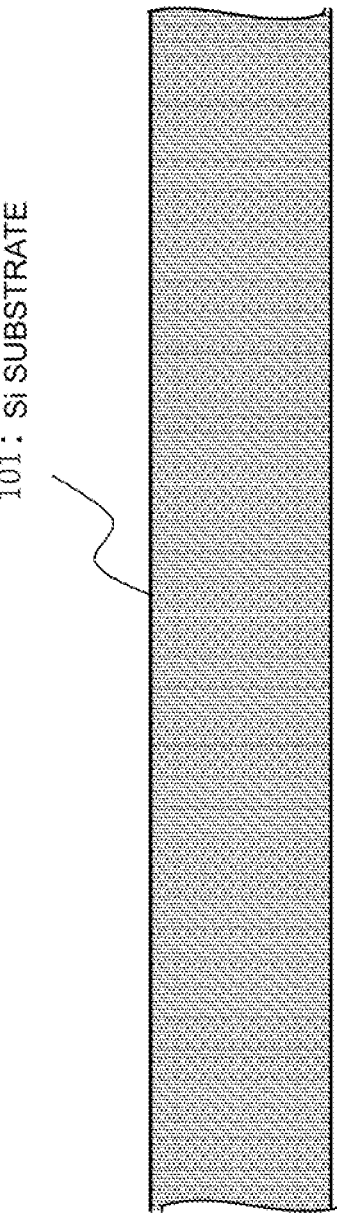
FIG. 6A is a diagram schematically illustrating the manufacturing process of another embodiment.
Figure 6B:
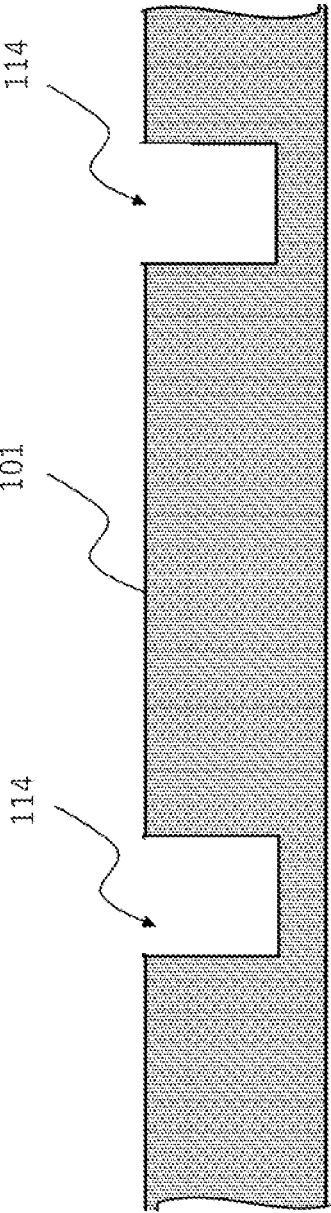
FIG. 6B is a diagram schematically illustrating the manufacturing process of another embodiment.
Figure 6C:
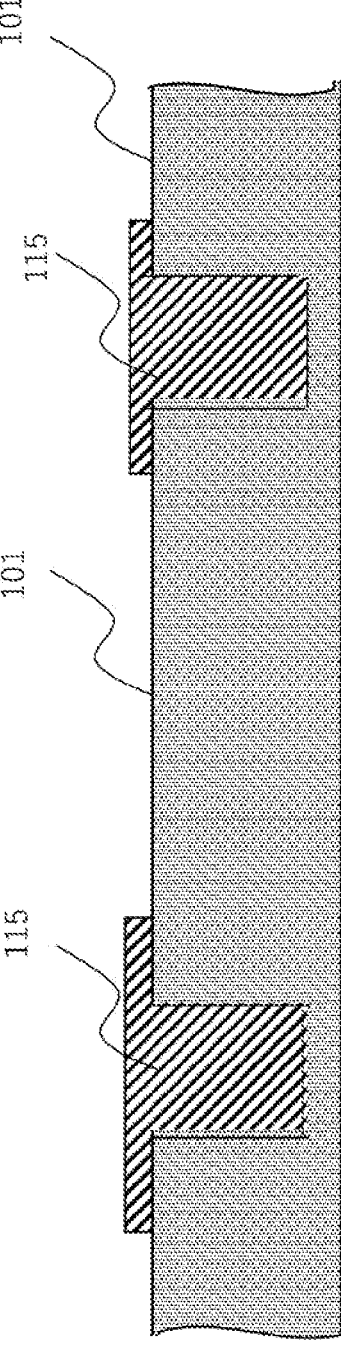
FIG. 6C is a diagram schematically illustrating the manufacturing process of another embodiment.
Figure 6D:
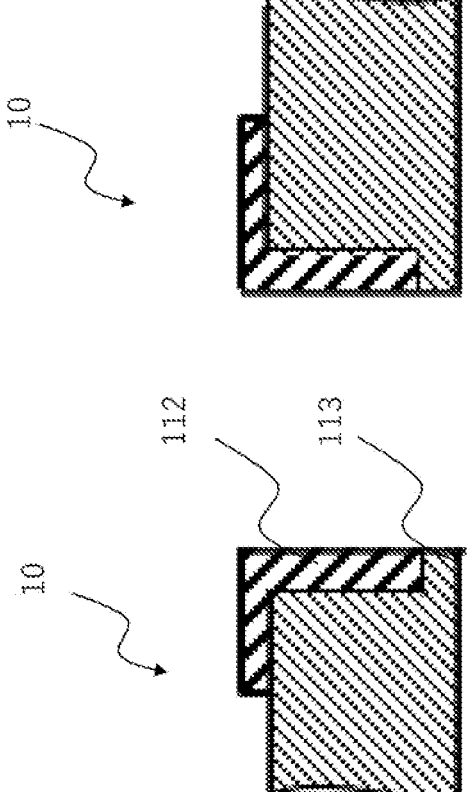
FIG. 6D is a diagram schematically illustrating the manufacturing process of another embodiment.

For the silicon substrate 101 (wafer) of FIG. 6A, a process of forming via holes 114 (blind via holes) on a surface of a scribed area located on an outer circumference portion corresponding to the side surface of the quantum chip of FIG. 6B, and a process of filling the via holes 114 with superconducting metal in FIG. 6C, a dicing process of cutting (separating) into the first quantum chip 10 at the scribe line on the metal via 115 in FIG. 6D. The first quantum chip 10 cut in the dicing process of FIG. 6D corresponds to a cross section along A-A line in FIG. 4B.

In the process of FIG. 6C, a filled via (filled plating) in which the via hole 114 is filled with metal is illustrated, but a conformal via with a concave via surface may be also used. Conformal plating enables deposition by plating at a uniform thickness even on a sidewall and a bottom surface of a via, which cannot be handled by sputtering.

In the process of FIG. 6B, a qubit circuit (wiring pattern) may be formed on the first surface (circuit plane) of the silicon substrate 101 and then via holes 114 may be opened on the silicon substrate 101 by dry etching or the like. Alternatively, after via holes 114 are opened by dry etching or the like on the silicon substrate 101 and filled with metal, a qubit circuit (wiring pattern) may be formed on the first surface (circuit plane) of silicon substrate 101. However, from the viewpoint of maintaining a shape of wiring on the first surface (circuit plane) of the silicon substrate 101, it is preferable to form wirings and electrodes on the first surface (circuit plane) of the silicon substrate 101 after the via holes 114 are filled with the superconducting metal 115 (metal via).

In the process illustrated in FIGS. 6B and 6B, bottomed vias (blind vias) are shown as via holes 114. But, through vias may well be used. In the case of the through via (Through Silicon Via: TSV), the protruding portion 113 directly below the side terminal 112 does not exist and the side terminal 112 has a height equivalent to a thickness of the first quantum chip 10. As illustrated in FIG. 6B, the via hole 114 may a blind via hole, and a back surface of the wafer may be polished before dicing to remove the protruding portion 113 to make the height of the side terminal 112 equivalent to the thickness of the first quantum chip 10.

Figure 6E:
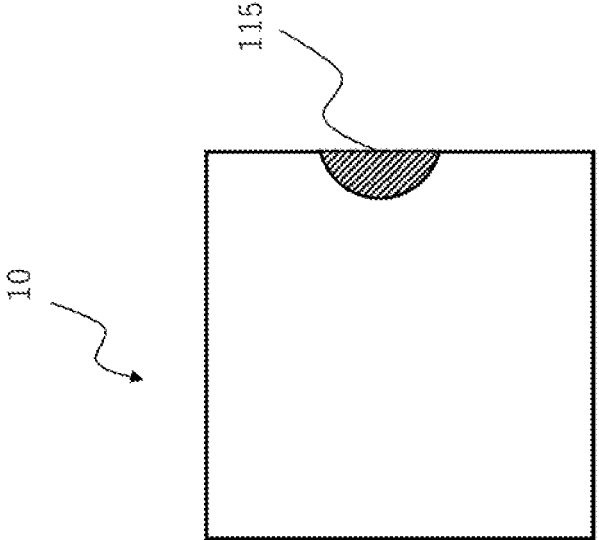
FIG. 6E is a diagram schematically illustrating the manufacturing process of another embodiment.
Figure 6F:
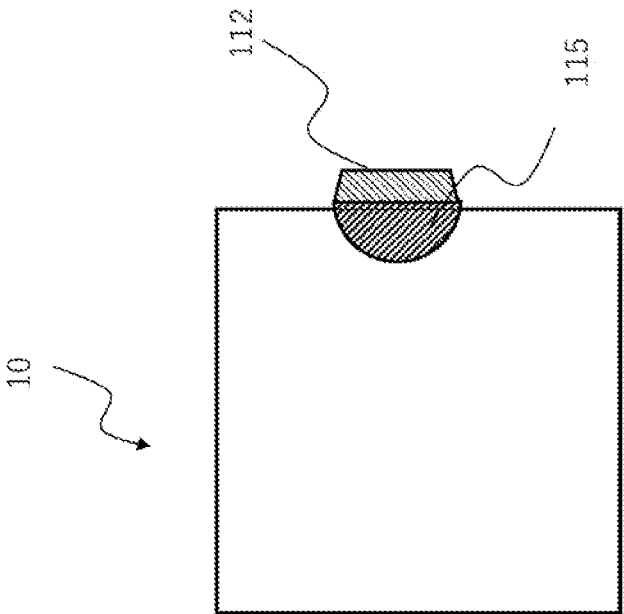
FIG. 6F is a diagram schematically illustrating the manufacturing process of another embodiment.

In the dicing process illustrated in FIG. 6D, the metal via 115 (FIG. 6C) located in the scribe line area is cut at a center or the like (scribe line) of the metal via 115 (FIG. 6C) to separate the first quantum chip 10. As illustrated schematically in FIG. 6E, a surface of the connection terminal 112 is flush with a side surface of the first quantum chip 10. However, by further depositing a superconducting metal film on a cut surface in FIG. 6E and processing the superconducting metal film deposited on the cut surface with a laser or other means, a convex electrode (bump) structure may be formed, as illustrated schematically in FIG. 6F. The side terminal 112 of the convex electrode in FIG. 6F is connected to the side terminal of the opposite second quantum chip 20 (which also has a convex electrode side terminal) is suitable for connection by capacitive coupling or inductor coupling. When vias are filled by using conformal plating in the via formation configuration of FIG. 6C, a surface of the metal via 115 is concave with respect to the side surface of the first quantum chip 10. In this case, by further forming a superconducting metal film on the surface of the metal via 115 on the side surface of the first quantum chip 10, the side terminal 112 may be formed as a convex electrode.

Figure 7A:
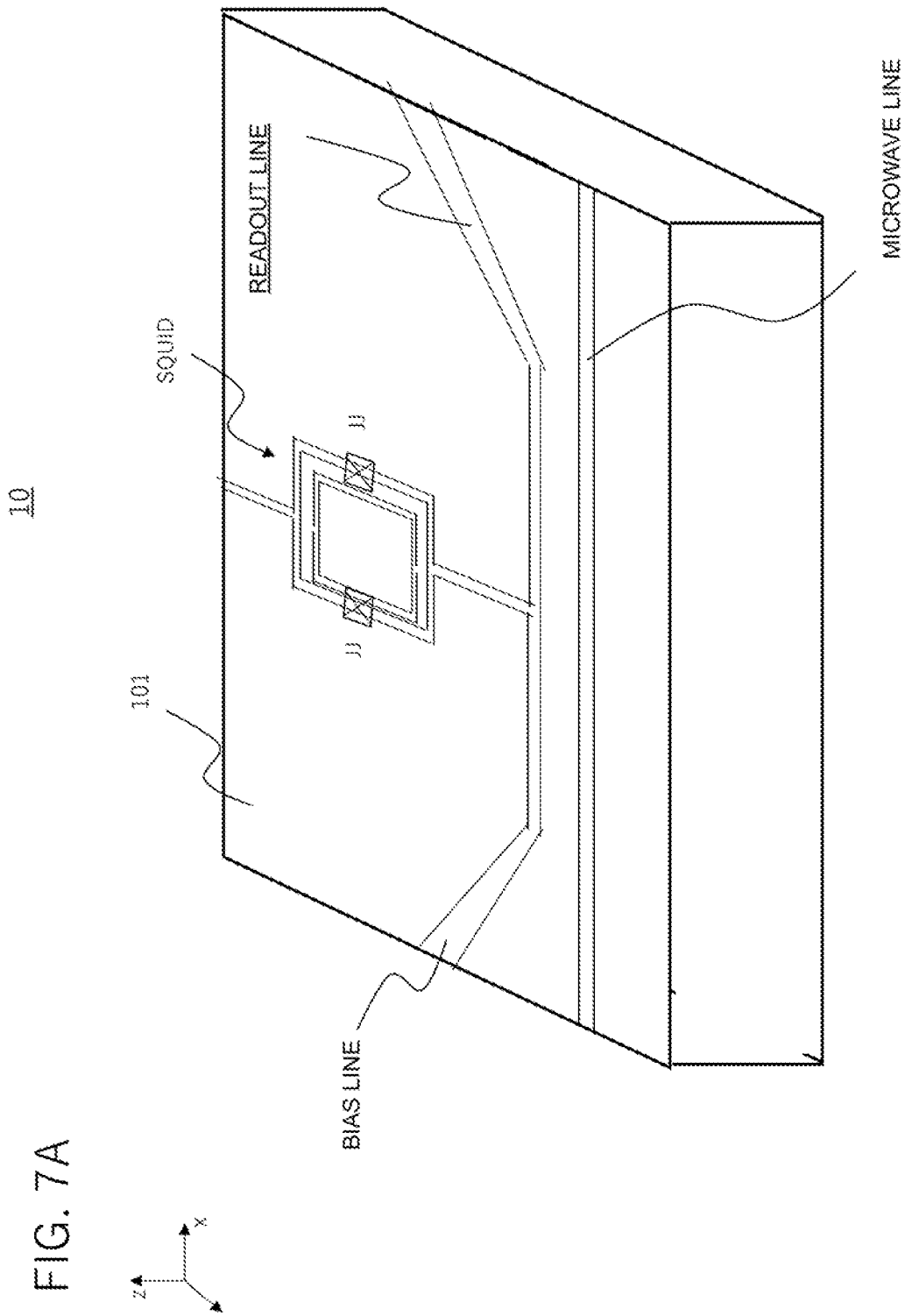
FIG. 7A is a diagram schematically illustrating an overview of another quantum chip.

FIGS. 7A-7G schematically illustrate variations of the second embodiment. FIG. 7A schematically illustrates an example of a magnetic flux type qubit circuit. In FIG. 7A, on the first surface (circuit plane) of the silicon substrate 101, a superconducting circuit of A1 wiring is formed on the first surface (circuit plane) of the silicon substrate 101, and by supplying a microwave current through a microwave line, data is written into a magnetic flux quantum bit circuit consisting of a SQUID (superconducting quantum device). The readout line is a circuit to observe a quantum state.

Figure 7B:
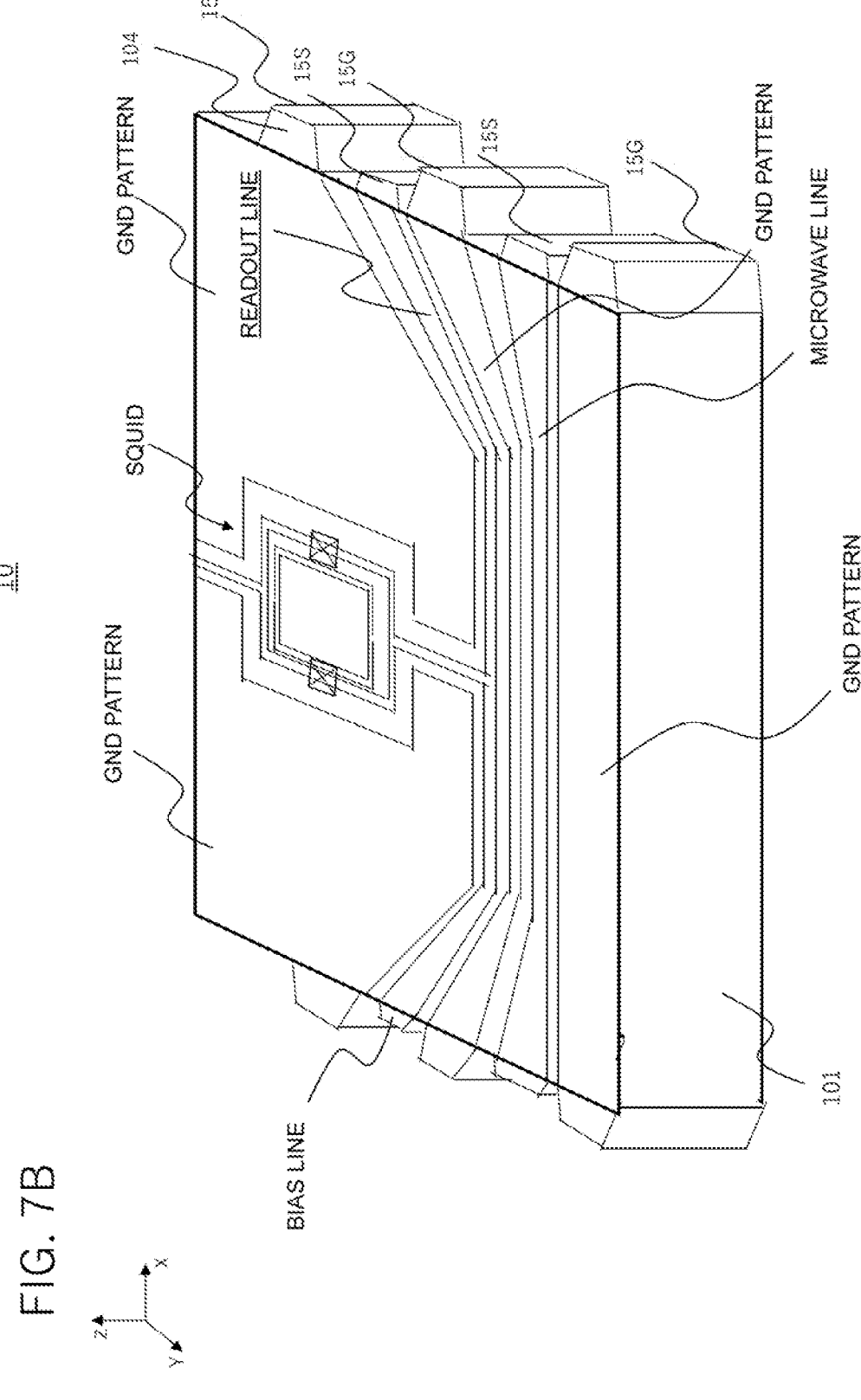
FIG. 7B is a diagram schematically illustrating an overview of another example of another embodiment applied to the quantum chip.

FIG. 7B schematically illustrates the first quantum chip 10 of FIG. 7A configured to have side terminals 15 according to the second embodiment. In FIG. 7B, the first quantum chip 10 of FIG. 7A is set to have a coplanar substrate configuration in which a ground (GND) patterns are placed on the first surface (circuit plane) of the silicon substrate 101. On both sides of the signal side terminals 15S connecting to the readout line and the microwave line, the ground terminals 15G are provided. The ground side terminals 15G are provided on the side surface of the silicon substrate 101 at an end of the protruding portion 104 and protruded more than the signal terminal 15S.

Figure 7C:
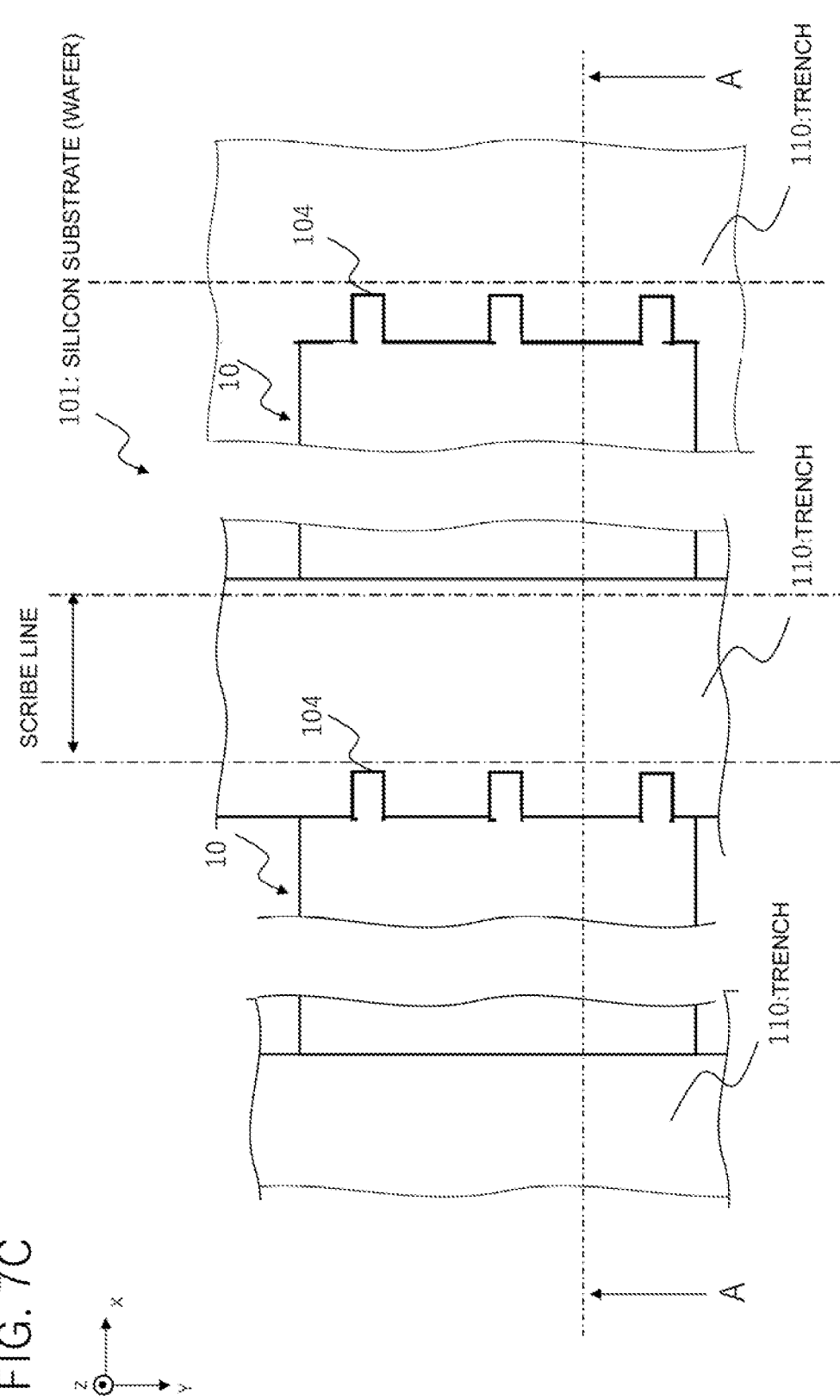
FIG. 7C is a plan view schematically illustrating another example of a quantum chip of another embodiment.

FIG. 7C schematically illustrates a trench formed in the fabrication of the first quantum chip 10 illustrated in FIG. 7B where the trench is formed on the silicon substrate 101 and a planar shape of the first quantum chip 10. FIG. 7D schematically illustrates a side cross section along line A-A of FIG. 7C. Referring to FIGS. 7C and 7D, in the process of forming the trench 110 on the surface of the scribe region (scribe line), protrusions 104 are formed corresponding to the ground side terminal on a side surface of the first quantum chip 10. More specifically, the trench 110 is formed, for example, by dry etching using a hard mask with an uneven pattern on the side surface of the first quantum chip 10 to provide a protruding portion 104 on the side surface. Thereafter, a signal side terminal 15S made of a superconducting metal film may be formed in a concave portion of the side surface of the first quantum chip 10 and the ground side terminal 15G may be formed at a tip of the protruding portion 104, which is a convex portion of the side surface of the chip 10. Although not particularly limited thereto, not only the tip of the protruding portion 104 of the first quantum chip 10, but also a side wall opposing the signal side terminal 15S may also be provided with a superconducting metal film.

FIG. 7E is a schematic plan view from a top of the first surface of the silicon substrate 101. FIG. 7E illustrates a configuration in which the signal side terminal 15S and the ground side terminal 15G are formed by depositing a superconducting metal film on sidewalls of the trench and the protruding portion 104 of the silicon substrate 101. The signal side terminal 15S and the ground side terminal 15G are formed on the sidewall of the trench 110 and at the tip of the protruding portion 104 and connected respectively to a signal line and a ground line (pattern) on the wiring layer 102 of the first quantum chip 10.

Figure 7F:
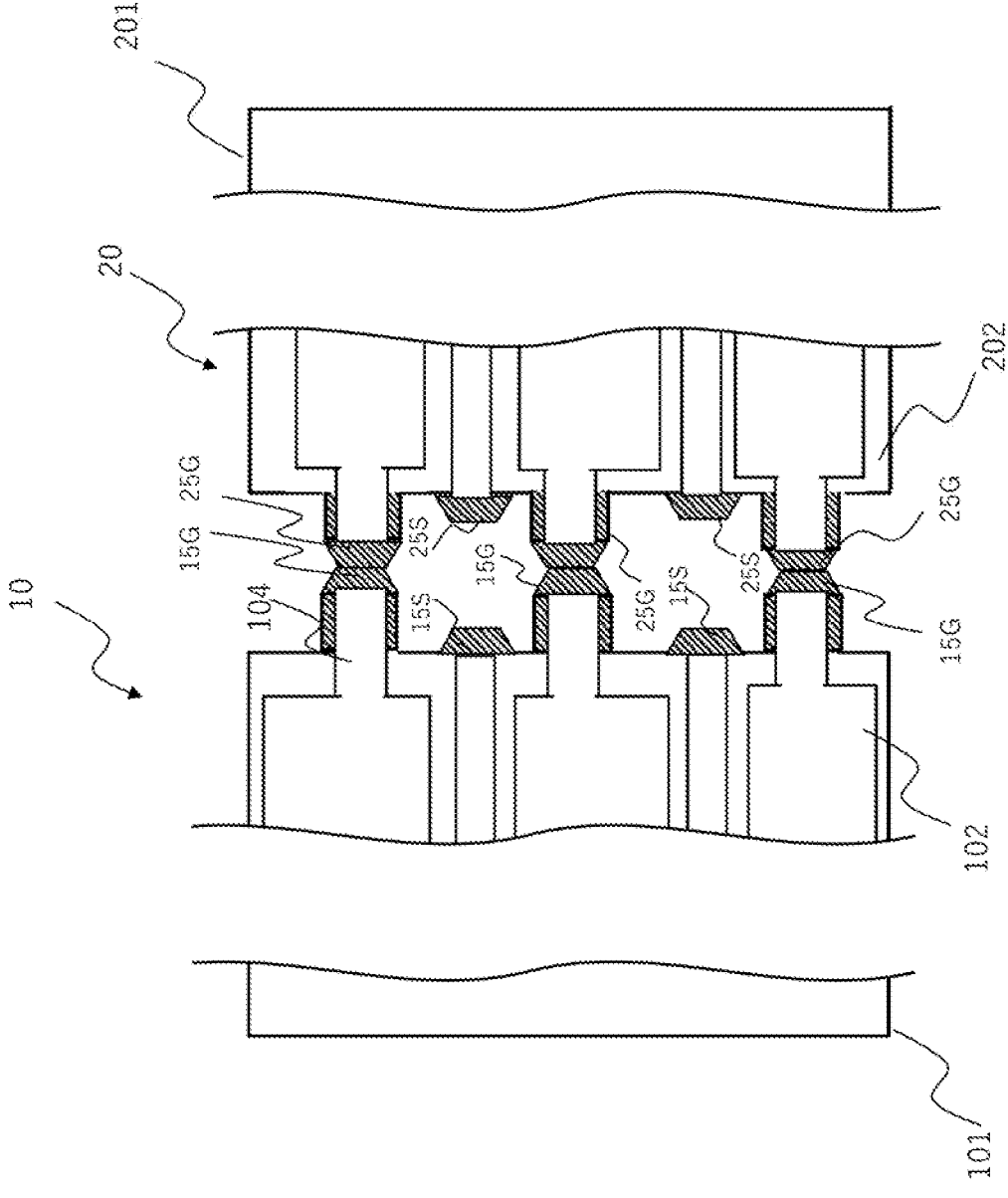
FIG. 7F is a plan view schematically illustrating another example of a quantum chip of another embodiment.

In FIG. 7F, the ground side terminal 15G of the first quantum chip 10 and the opposing ground side terminal 25G of the second quantum chip 20 are joined and the first quantum chip signal side terminal 15S of the first quantum chip 10 and the signal side terminal of the second quantum chip 20 25S are opposed and set apart from each other to transmit and/or receive signals by capacitive or inductive coupling. The ground side terminal 15G of the first quantum chip 10 and the ground side terminal 25G of the second quantum chip 20 may be joined by solder bonding, ultrasonic thermocompression bonding. In FIG. 7F, a coplanar transmission line configuration in which ground patterns are provided via gaps on both sides of the signal line on the first surface of the substrate 101. The ground side terminal 15G is connected to the ground pattern on the first surface (circuit plane). However, when the second surface (back surface) of the substrate 101 is a ground plane, the ground side terminal 15G may be configured to be connected to the ground plane of the second surface (back surface) of the substrate 101.

In FIG. 7F, the first quantum chip 10 and the second quantum chip 20 both have the side terminals arranged in a concave-convex manner. That is, the ground side terminals 15G and 25G are arranged in protruding (convex) portions of the side surfaces, and the signal side terminals 15S and 25S are arranged in the concave portions of the side surfaces. However, either the first quantum chip 10 or the second quantum chip 20 may have the side terminals of a concave-convex configuration, while the other may be configured to have the side terminals on the flat side surface. For example, in the example of FIG. 7G, the first quantum chip 10 has a ground side terminal 15F located at the tip of the protruding portion 104 protruding from the side surface of the chip, while the second quantum chip 20 has the ground side terminal 25G arranged on the flat surface of the chip side, as with the signal side terminal 25S.

As a non-limiting example, the side terminals 15 may be arranged in such a way that for each signal side terminal 15S, a terminal set (triplet) made up of a ground side terminal 15G, a signal side terminal 15S, and a ground side terminal 15G are arranged.

Figure 8:
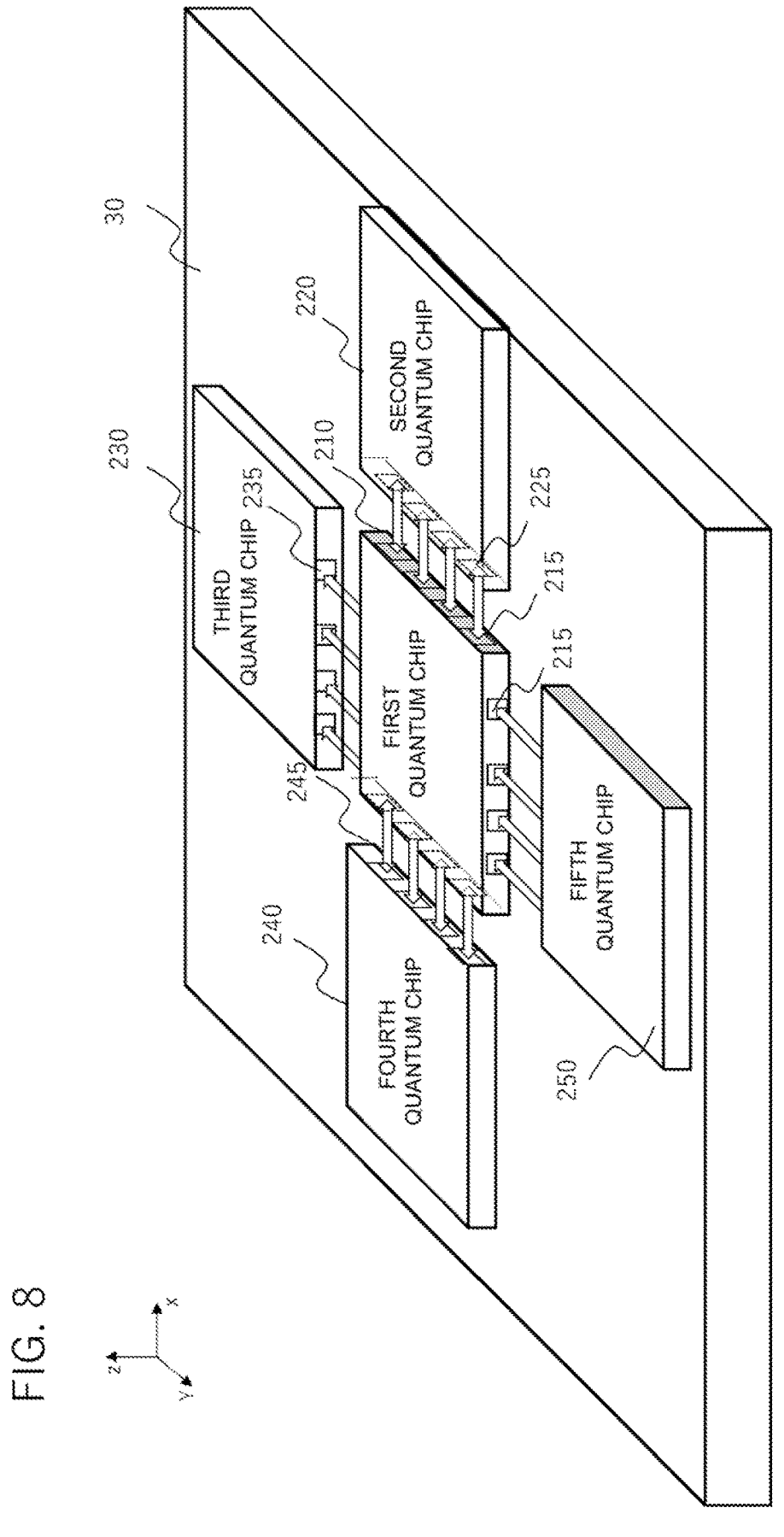
FIG. 8 is a diagram schematically illustrating an overview of a quantum device of another embodiment.
Figure 9A:
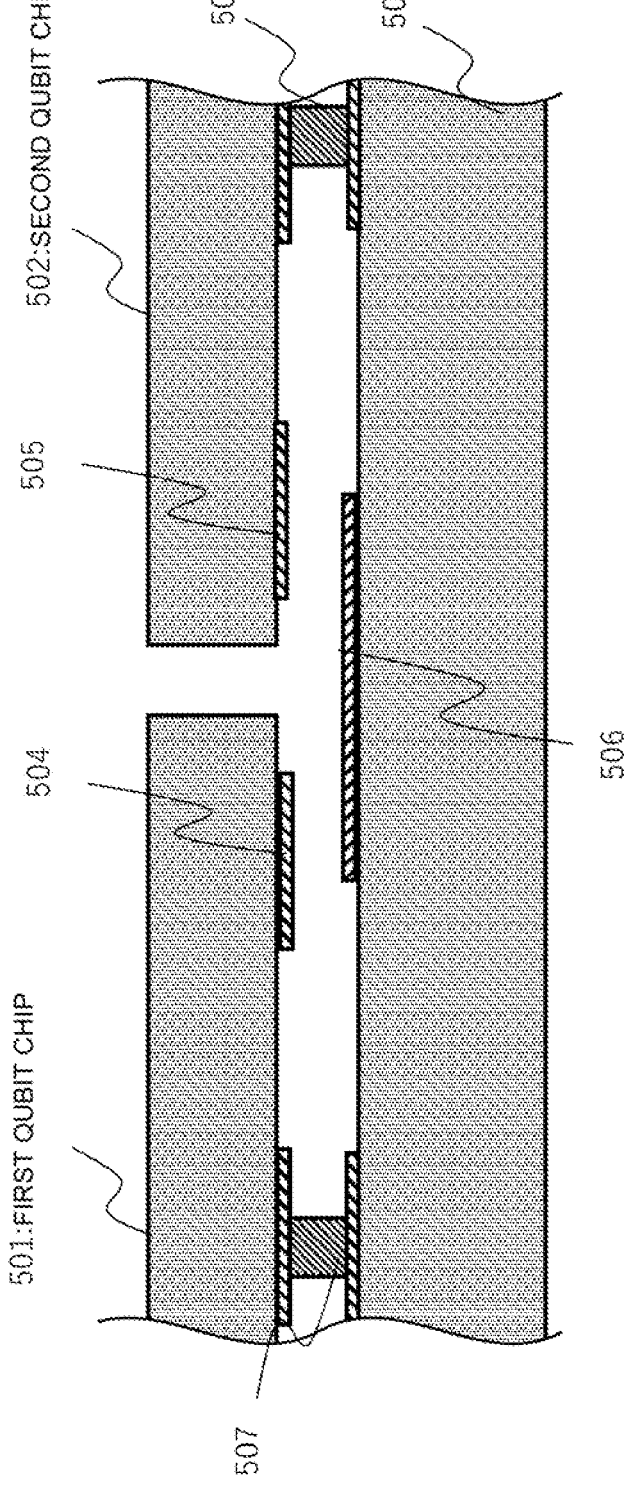
FIG. 9A is a diagram schematically illustrating a related technology.
Figure 9B:
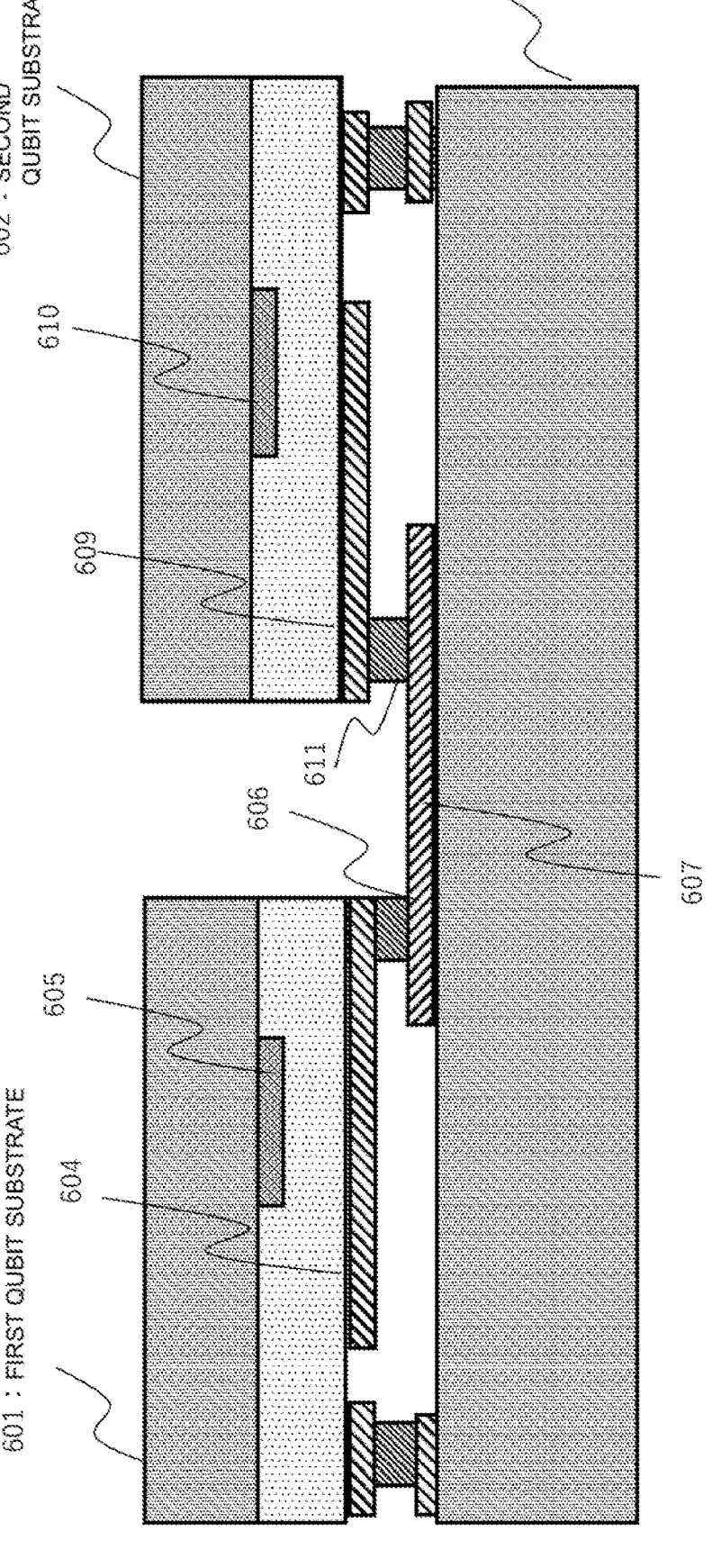
FIG. 9B is a diagram schematically illustrating another related technology.
Figure 9C:
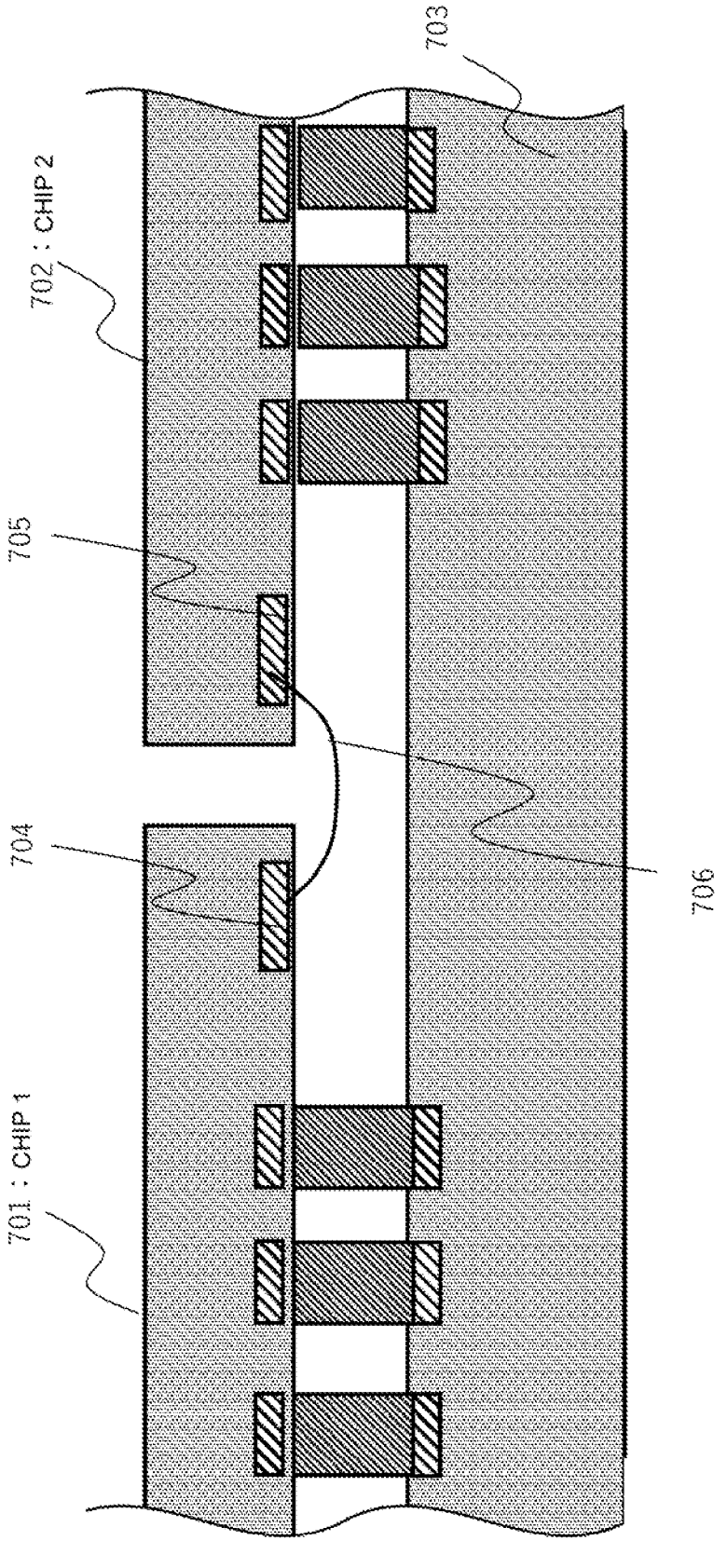
FIG. 9C is a diagram schematically illustrating yet another related technology.

FIG. 8 schematically illustrates a variation of another embodiment. The first through fifth quantum chips 210-250 are flip-chip mounted on the interposer substrate 30 with the first surface (circuit plane) faced down. The second through fifth qubits 220-250 are arranged on four sides of the first quantum chip 210.

Side terminals 215 on a side surface of one edge of the first quantum chip 210 are placed opposite to the side terminals 225 of the opposite second quantum chip 220, and signal transmission and/or reception therebetween are performed by a metal (convex electrode, bump) connection, or a wireless connection (capacitive or inductor coupling). Side terminals provided on side surfaces of the remaining three edges of the first quantum chip 210 are placed opposite to the side terminals of the third to fifth quantum chips 230-250 respectively and signal transmission and/or reception therebetween are performed by a metal (convex electrode, bump) connection, or a wireless connection (capacitive or inductor coupling).

According to each of the above embodiments, it is possible to suppress characteristic variations due to, for example, yield reduction and pseudo-error (thinning or swelling of conductors) by configuring the apparatus with a plurality of quantum chips and a plurality of interposer substrates. Furthermore, a plurality of qubit circuits are designed to have a qubit circuit. Furthermore, connection of a plurality of quantum chips with qubit circuits is implemented as a direct connection between quantum chips, which makes it possible to improve power loss and superimposed noise at the connection.

The above example embodiments can partially or entirely be described as following Supplementary notes (Notes), though not limited thereto.

(Note 1) A quantum device comprising: a first quantum chip, a a second quantum chip, and one or more interposer substrates for mounting the first quantum chip and the second quantum chip, wherein the first quantum chip and the second quantum chip mounted on a same interposer substrate or different interposer substrates, have respectively surfaces with at least partial regions thereof opposed to each other, and wherein an electrical connection is made between mutually opposing connection terminals arranged respectively in the at least partial regions of the surfaces, opposed to each other, of the first quantum chip and the second quantum chip.

(Note 2) The quantum device according to Note 1, wherein the first quantum chip and the second quantum chip each have a connection terminal in the partial region in a surface identical with a first surface on which at least one qubit circuit is arranged.

(Note 3) The quantum device according to Note 2, wherein the interposer substrate includes: a first interposer substrate and a second interposer substrate mounting the first quantum chip and the second quantum chip, respectively, wherein the first quantum chip is mounted on the first interposer substrate with at least one edge of the first quantum chip protruding an edge of the first interposer substrate, the partial region of the first surface of the first quantum chip facing with the partial region of the first surface of the second quantum chip, and electrical connection is made between one or a plurality of connection terminals provided in the partial region of the first surface of the first quantum chip, the partial region protruding the edge of the first interposer substrate, and one or a plurality of the connection terminals provided in the partial region of the first surface of the second quantum chip, the partial region of the second quantum chip facing with the partial region of the first quantum chip.

(Note 4) The quantum device according to Note 3, wherein the first quantum chip is mounted on the first interposer substrate with the first surface down, the second quantum chip is mounted on the second interposer substrate mounted on the second interposer substrate with a second surface down, the second surface opposite to the first surface, the connection terminal provided in the partial region of the first surface of the first quantum chip, and the connection terminal provided in the partial region of the first surface of the second quantum chip and electrically connected to the connection terminal provided in the partial region of the first surface of the first quantum chip are located at a same location in a plane and opposed to each other above and below.

(Note 5) The quantum device according to any one of Notes 2 to 4, comprising a lid chip arranged opposite to a surface of the second quantum chip, the surface faving a region opposing the partial region in the first surface of the first quantum chip, the lid chip covering some or all of areas of the surface other than the region opposing the partial region of the first quantum chip, the lid-shaped chip having a ground plane on a surface facing with the second quantum chip.

(Note 6) The quantum device according to Note 1, wherein the first quantum chip and the second quantum chip each includes at least a connection terminal provided on at least a side surface thereof.

(Note 7) The quantum device according to Note 6, wherein the first quantum chip and the second quantum chip are mounted on a same interposer substrate, the connection terminal on the side surface of the first quantum chip and the connection terminal on the side surface of the second quantum chip are positioned opposite each other.

(Note 8) The quantum device according to Note 7, wherein the first quantum chip and the second quantum chip are each mounted on a same interposer substrate with the first surface on which at least one qubit circuit is arranged, face down.

(Note 9) The quantum device according to any one of Notes 6 to 8, wherein the side surface of the at least one of the first quantum chip and the second quantum chip has a concave and convex portion, on each of which the connection terminal is provided.

(Note 10) The quantum device according to any one of Notes 6 to 8, wherein at least one of the first quantum chip and the second quantum chip has at least two protruding portions on a side surface of the substrate of the quantum chip, the two protruding portions disposed apart from each other and protruded orthogonally to the side surface, the at least one of the first quantum chip and the second quantum chip including the connection terminal provided at a region between the two protrued portions and the connection terminal provided at the protruding portion, on the side surface.

(Note 11) The quantum device according to any one of Notes 1 to 10, wherein electrical connection of the mutually opposing one or a plurality of pairs of the connection terminals of the first and second quantum chips includes at least one of:

a wired connection by a conductive member;

a wireless connection by capacitive coupling or inductor coupling; and a mixture of the wired connection and the wireless connection.

(Note 12) The quantum device according to any one of Notes 1 to 11, wherein at least one of the first and second quantum chips includes one or a plurality of connection terminals opposing one or a plurality of connection terminals of the interposer substrate on which the at least one of the first and second quantum chips is mounted, electrically connected to the one or the plurality of connection terminals of the interposer substrate in a connection form including:

a wired connection by a conductive member;

a wireless connection by capacitive coupling or inductor coupling; and a mixture of the wired connection and the wireless connection.

(Note 13) The quantum device according to any one of Notes 1 to 11, wherein at least one of the first and second quantum chips has at least one corner out of the four corners cut.

(Note 14) The quantum device according to any one of Notes 6 to 8, wherein the connection terminal of at least one of the first and second quantum chips includes a superconducting metal formed on a sidewall of a trench opened on a surface of a region of a scribe line in a direction along the side surface on a wafer on which the at least one of the first and second quantum chips is formed, or a portion of a superconducting metal filled in a via hole opened on the surface of the region of the scribe line in the direction along the side surface.

The disclosure of each of the above PTLs 1 to 3 and NPLs 1 and 2 is incorporated herein by reference thereto. Modifications and adjustments of the example embodiments and examples are possible within the scope of the overall disclosure (including the claims) of the present invention and based on the basic technical concept of the present invention. Various combinations or selections of various disclosed elements (including the elements in each of the notes, example embodiments, drawings, etc.) are possible within the scope of the claims of the present invention. That is, the present invention of course includes various variations and modifications that could be made by those skilled in the art according to the overall disclosure including the claims and the technical concept.

What is claimed is:

1. A quantum device comprising:

a first quantum chip;

a second quantum chip; and one or more interposer substrates mounting the first quantum chip and the second quantum chip, wherein the first quantum chip and the second quantum chip mounted on a same interposer substrate or different interposer substrates, have surfaces with at least partial regions thereof opposed to each other, the first quantum chip and the second quantum chip including mutually opposing connection terminals arranged respectively in the at least partial regions of the surfaces, opposed to each other, of the first quantum chip and the second quantum chip, the mutually opposing connection terminals of the first quantum chip and the second quantum chip electrically connected, wherein the first quantum chip and the second quantum chip each include the connection terminal in the partial region in the surface identical with a first surface including a wiring plane for at least one qubit circuit thereon, wherein the interposer substrate includes a first interposer substrate and a second interposer substrate mounting the first quantum chip and the second quantum chip, respectively, wherein the first quantum chip is mounted on the first interposer substrate with at least one side edge of the first quantum chip protruded more than a side edge of the first interposer substrate, the partial region of the first surface of the first quantum chip protruded more than the side edge of the first interposer substrate, facing with the partial region of the first surface of the second quantum chip, and electrical connection is made between one or a plurality of connection terminals provided in the partial region of the first surface of the first quantum chip protruded more than the side edge of the first interposer substrate, and one or a plurality of connection terminals provided in the partial region of the first surface of the second quantum chip, the partial region of the second quantum chip facing with the partial region of the first quantum chip.

2. The quantum device according to claim 1, wherein the first quantum chip is mounted on the first interposer substrate with the first surface down, the second quantum chip is mounted on the second interposer substrate mounted on the second interposer substrate with a second surface down, the second surface opposite to the first surface, the connection terminal provided in the partial region of the first surface of the first quantum chip, and the connection terminal provided in the partial region of the first surface of the second quantum chip and electrically connected to the connection terminal provided in the partial region of the first surface of the first quantum chip are located at a same location in a plane and opposed to each other up and down.

3. The quantum device according to claim 1, wherein electrical connection of the mutually opposing one or a plurality of pairs of the connection terminals of the first and second quantum chips includes at least one of:

a wired connection by a conductive member;

a wireless connection by capacitive coupling or inductor coupling; and a mixture of the wired connection and the wireless connection.

4. The quantum device according to claim 1, wherein at least one of the first and second quantum chips includes one or a plurality of connection terminals opposing one or a plurality of connection terminals of the interposer substrate on which the at least one of the first and second quantum chips is mounted, electrically connected to the one or the plurality of connection terminals of the interposer substrate in a connection form including:

a wired connection by a conductive member;

a wireless connection by capacitive coupling or inductor coupling; and a mixture of the wired connection and the wireless connection.

5. The quantum device according to claim 1, wherein at least one of the first and second quantum chips has at least one corner out of four corners cut.

6. A quantum device comprising:

a first quantum chip;

a second quantum chip; and one or more interposer substrates mounting the first quantum chip and the second quantum chip, wherein the first quantum chip and the second quantum chip mounted on a same interposer substrate or different interposer substrates, have surfaces with at least partial regions thereof opposed to each other, the first quantum chip and the second quantum chip including mutually opposing connection terminals arranged respectively in the at least partial regions of the surfaces, opposed to each other, of the first quantum chip and the second quantum chip, the mutually opposing connection terminals of the first quantum chip and the second quantum chip electrically connected, wherein the first quantum chip and the second quantum chip each include the connection terminal in the partial region in the surface identical with a first surface including a wiring plane for at least one qubit circuit thereon, wherein the interposer substrate includes a first interposer substrate and a second interposer substrate mounting the first quantum chip and the second quantum chip, respectively, the quantum device further comprising:

a lid chip arranged opposite to the first surface of the second quantum chip, the first surface of the second quantum chip including the partial region opposing the partial region of the first surface of the first quantum chip, the lid chip covering a part or all of an area of the first surface other than the partial region of the second quantum chip opposing the partial region of the first surface of the first quantum chip, the lid chip including a ground plane on a surface facing with the first surface of the second quantum chip.

7. A quantum device comprising:

a first quantum chip;

a second quantum chip; and one or more interposer substrates mounting the first quantum chip and the second quantum chip, wherein the first quantum chip and the second quantum chip mounted on a same interposer substrate or different interposer substrates, have surfaces with at least partial regions thereof opposed to each other, the first quantum chip and the second quantum chip including mutually opposing connection terminals arranged respectively in the at least partial regions of the surfaces, opposed to each other, of the first quantum chip and the second quantum chip, the mutually opposing connection terminals of the first quantum chip and the second quantum chip electrically connected, wherein the first quantum chip and the second quantum chip each include the connection terminal provided on at least a side surface of each of the first quantum chip and the second quantum chip, wherein the side surface of at least one of the first quantum chip and the second quantum chip includes a concave portion and a convex portion, on each of which the connection terminal is provided.

8. The quantum device according to claim 7, wherein the first quantum chip and the second quantum chip are mounted on a same interposer substrate, the connection terminal on the side surface of the first quantum chip and the connection terminal on the side surface of the second quantum chip are positioned opposed to each other.

9. The quantum device according to claim 7, wherein at least one of the first quantum chip and the second quantum chip includes at least two protruding portions on a side surface of the substrate of the quantum chip, the two protruding portions disposed apart from each other, the at least one of the first quantum chip and the second quantum chip including the connection terminal provided at a region between the two protruding portions and the connection terminal provided at the protruding portion, on the side surface.

10. The quantum device according to claim 9, wherein the at least one of the first quantum chip and the second quantum chip includes a signal terminal as the connection terminal provided at the region between the two protruding portions on the side surface and a ground terminal as the connection terminal provided at the protruding portions, on the side surface, the signal terminal arranged between the ground terminals, the mutually opposing ground terminals on the side surfaces of the first quantum chip and the second quantum chip connected by a wired connection, while the mutually opposing signal terminals on the side surfaces of the first quantum chip and the second quantum chip connected by a wireless connection.

11. The quantum device according to claim 7, wherein the connection terminal of at least one of the first quantum chip and the second quantum chip includes a superconducting metal formed on a sidewall of a trench opened on a surface of a region of a scribe line in a direction along the side surface on a wafer on which the at least one of the first and second quantum chips is formed.

12. The quantum device according to claim 7, wherein the connection terminal of at least one of the first chips and the second quantum chip includes a portion of a superconducting metal filled in a via hole opened on a surface of a region of a scribe line in a direction along the side surface of at least one of the first chips and the second quantum chip on a wafer on which the at least one of the first and second quantum chips is formed.

13. The quantum device according to claim 12, wherein at least one of the first chips and the second quantum chip includes the connection terminal including the superconducting metal formed as a convex structure on the side surface at a portion corresponding to a location the via hole which is cut along the scribe line in a dicing process of the wafer, the convex structure formed at least by depositing a superconducting metal on a cut surface of the via hole.

* * * * *